(12) United States Patent
Ederer et al.

(10) Patent No.: US 11,124,009 B2
(45) Date of Patent: Sep. 21, 2021

(54) SECURITY INLAY FOR AN IDENTITY DOCUMENT AND METHOD FOR PRODUCING A SECURITY INLAY FOR AN IDENTITY DOCUMENT

(71) Applicant: Muehlbauer GmbH & Co. KG, Roding (DE)

(72) Inventors: Martin Ederer, Poesing (DE); Franz Hoecherl, Rattiszell (DE); Anton Brunner, Bad Koetzting (DE); Franz Brandl, Sattelpeilnstein Gemeinde Traitsching (DE); Michael Wanjek, Nittenau (DE); Thomas Michl, Stamsried (DE)

(73) Assignee: MUEHLBAUER GMBH & CO. KG, Roding (DE)

( * ) Notice: Subject to any disclaimer, the term of this patent is extended or adjusted under 35 U.S.C. 154(b) by 0 days.

(21) Appl. No.: 16/608,754

(22) PCT Filed: Apr. 18, 2018

(86) PCT No.: PCT/EP2018/059814
§ 371 (c)(1),
(2) Date: Oct. 25, 2019

(87) PCT Pub. No.: WO2018/197277
PCT Pub. Date: Nov. 1, 2018

(65) Prior Publication Data
US 2020/0180347 A1    Jun. 11, 2020

(30) Foreign Application Priority Data

Apr. 26, 2017 (DE) .................... 10 2017 004 039.7
Mar. 19, 2018 (CN) .......................... 201810226236.5

(51) Int. Cl.
*B42D 25/382* (2014.01)
*B42D 25/41* (2014.01)
(Continued)

(52) U.S. Cl.
CPC ......... *B42D 25/382* (2014.10); *B42D 25/328* (2014.10); *B42D 25/387* (2014.10);
(Continued)

(58) Field of Classification Search
CPC ............................. B42D 25/382; B42D 25/41
See application file for complete search history.

(56) References Cited

U.S. PATENT DOCUMENTS 5,350,198 A * 9/1994 Bernecker ................ B41M 3/14
283/67
2003/0234286 A1 12/2003 Labrec et al.
(Continued)

FOREIGN PATENT DOCUMENTS

DE 4134539 A1 4/1993
DE 69935400 T2 11/2007
(Continued)

OTHER PUBLICATIONS

WO-2011020537-A1 English Translation (Year: 2011).*
(Continued)

*Primary Examiner* — Kyle R Grabowski
(74) *Attorney, Agent, or Firm* — Shumaker, Loop & Kendrick, LLP; John A. Miller

(57) ABSTRACT

A security inlay having optically recognizable characters for an identity document comprises a first transparent layer and a second transparent layer. The first and second transparent layers are connected to one another. A first portion of the optically recognizable characters is formed by blackened sections in at least one of the layers. A second portion of the optically recognizable characters is formed by the color
(Continued)

coating. The first and second portions are arranged and configured to reflect visible light. Infrared light is reflected by the first portion of the optical characters. During irradiation with visible light, the security inlay thus shows first graphical information formed jointly by the first portion of the optically recognizable characters and the second portion of the optically recognizable characters. Under irradiation with infrared light, the security inlay shows second graphical information formed by the first portion of the optical characters.

19 Claims, 17 Drawing Sheets

(51) Int. Cl.
*B42D 25/328* (2014.01)
*B42D 25/387* (2014.01)
*B42D 25/455* (2014.01)
*B42D 25/46* (2014.01)
*G06K 19/07* (2006.01)
*G06K 19/077* (2006.01)

(52) U.S. Cl.
CPC ........... *B42D 25/41* (2014.10); *B42D 25/455* (2014.10); *B42D 25/46* (2014.10); *G06K 19/0723* (2013.01); *G06K 19/07773* (2013.01)

(56) References Cited

U.S. PATENT DOCUMENTS

| | | | |
|---|---|---|---|
| 2011/0204617 A1 | 8/2011 | Sugden et al. | |
| 2014/0119511 A1* | 5/2014 | Ward | G01N 23/207 378/71 |
| 2014/0319816 A1* | 10/2014 | Schiffmann | B42D 25/36 283/85 |
| 2018/0222243 A1* | 8/2018 | Yamada | B41M 5/26 |
| 2018/0311997 A1* | 11/2018 | Triepel | B42D 25/29 |

FOREIGN PATENT DOCUMENTS

| | | | | |
|---|---|---|---|---|
| DE | 102007052947 A1 | | 5/2009 | |
| DE | 102008012419 A1 | | 5/2009 | |
| DE | 102007059746 A1 | | 6/2009 | |
| DE | 102007059747 A1 | | 6/2009 | |
| DE | 102008012437 A1 | | 9/2009 | |
| DE | 102013218861 A1 | | 3/2015 | |
| DE | 102015108432 A1 | | 12/2016 | |
| DE | 102016201709 A1 | * | 8/2017 | ............ B42D 25/23 |
| DE | 102017010060 A1 | * | 6/2018 | ........... B42D 25/324 |
| EP | 0244887 B1 | | 12/1989 | |
| EP | 2004415 B1 | | 12/2010 | |
| EP | 2346698 B1 | | 1/2014 | |
| EP | 1703885 B1 | | 3/2014 | |
| EP | 2998127 A1 | | 3/2016 | |
| EP | 3034318 A1 | | 6/2016 | |
| EP | 3431305 A1 | * | 1/2019 | ........... B42D 25/378 |
| WO | 2005062978 A2 | | 7/2005 | |
| WO | WO-2006056216 A1 | * | 6/2006 | ............ B42D 25/23 |
| WO | 2011020537 A1 | | 2/2011 | |
| WO | WO-2011020537 A1 | * | 2/2011 | ............. B41M 3/14 |
| WO | WO-2012175191 A2 | * | 12/2012 | ............ B42D 25/41 |
| WO | WO-2013143009 A1 | * | 10/2013 | ........... B42D 25/382 |
| WO | 2015144646 A1 | | 10/2015 | |
| WO | 2015184556 A1 | | 12/2015 | |

OTHER PUBLICATIONS

Inkjet Blog https://blog.inkjetwholesale.com.au/printer-education/how-long-does-photo-printing-ink-take-to-dry/ (Year: 2015).*
PCT International Search Report of the International Searching Authority dated Jul. 20, 2018 and dated Aug. 20, 2018 for International Application No. PCT/EP2018/059814 filed Apr. 18, 2018.
Europaische Norm European Standard Norme Europeenne; EN ISO/IEC 7810; Jul. 1996.
Graphic technology—Colour and transparency of ink sets for four-colour-printing; International Standard; Reference No. ISO 2846-1:1997(E); First edition Dec. 15, 1997.
Farbe und Transparenz der Skalendruckfarben für den Vierfarbendruck; Teil 2: Rollenoffset-Coldset-Druck; ISO 2846-2:2000; Reference No. DIN ISO 2846-2:2003-01; 16 pages.

* cited by examiner

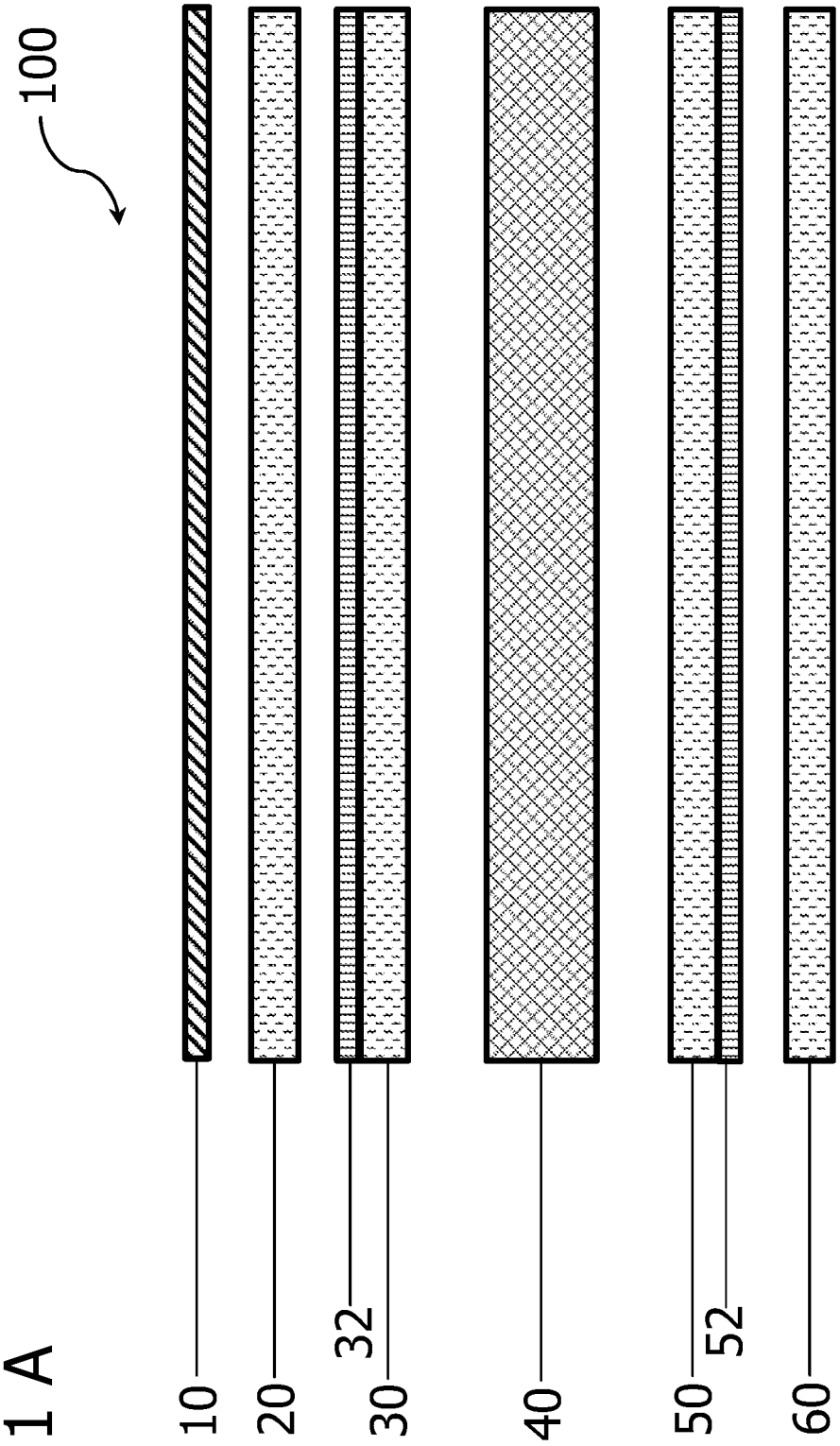

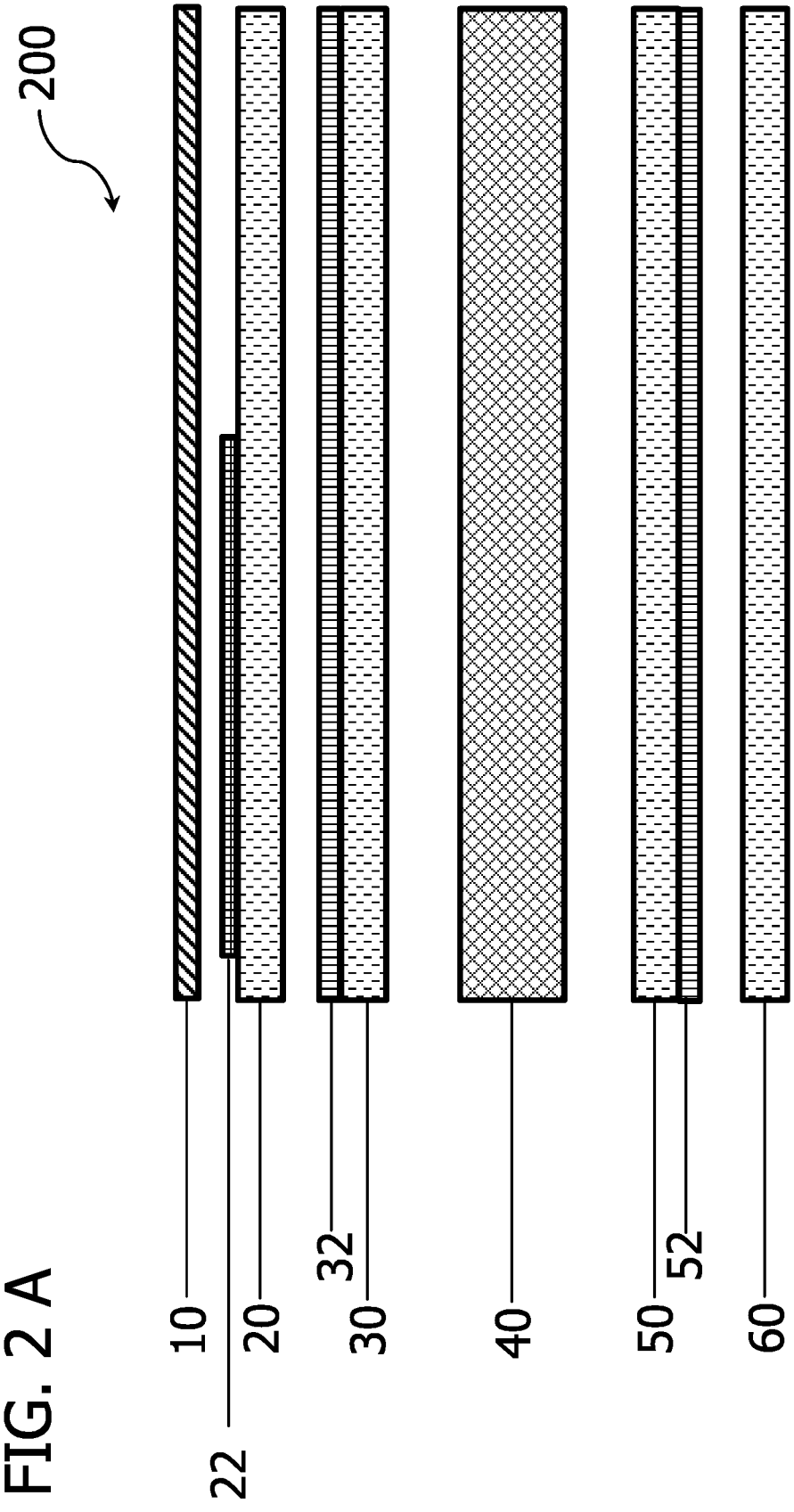

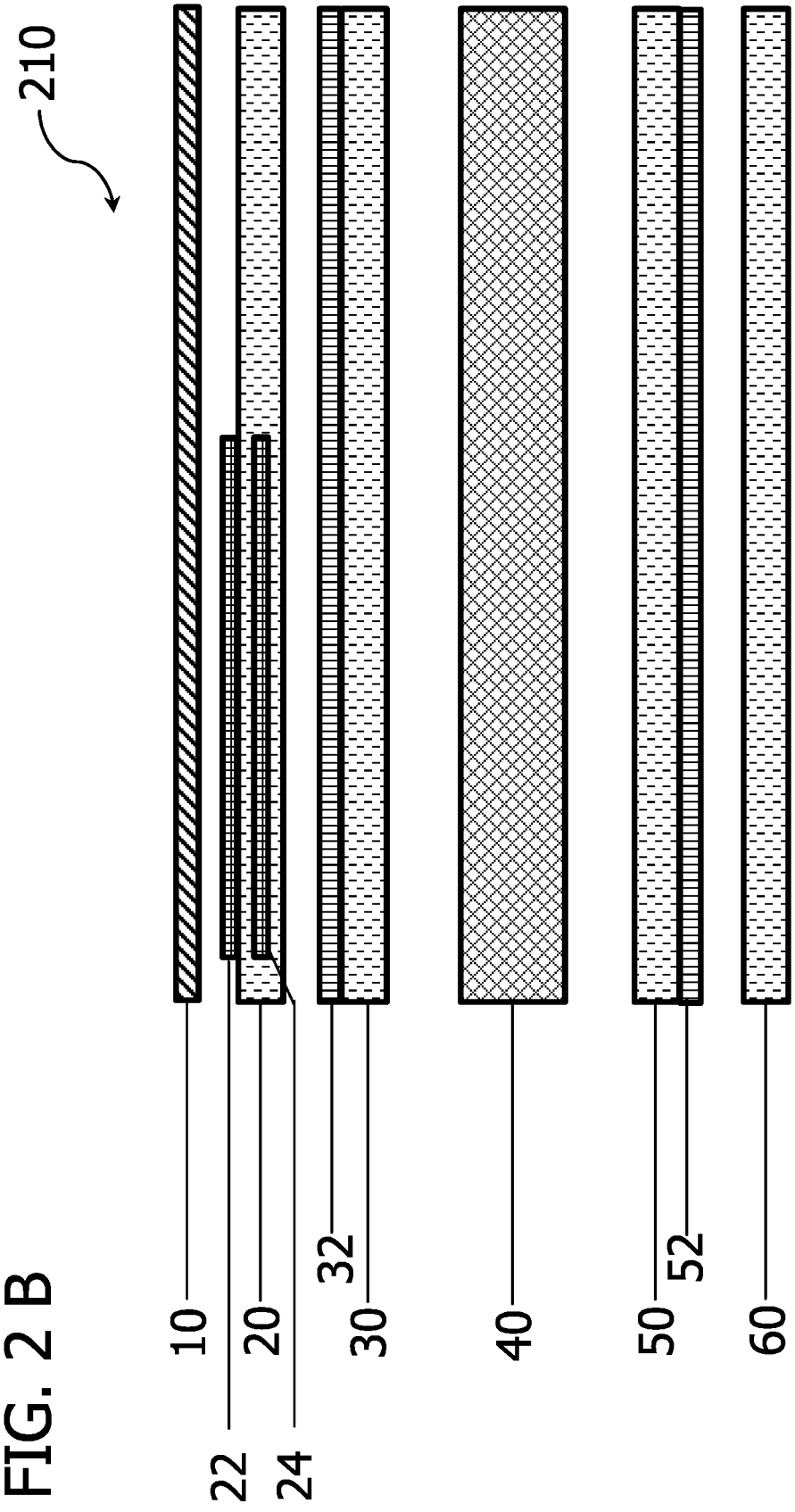

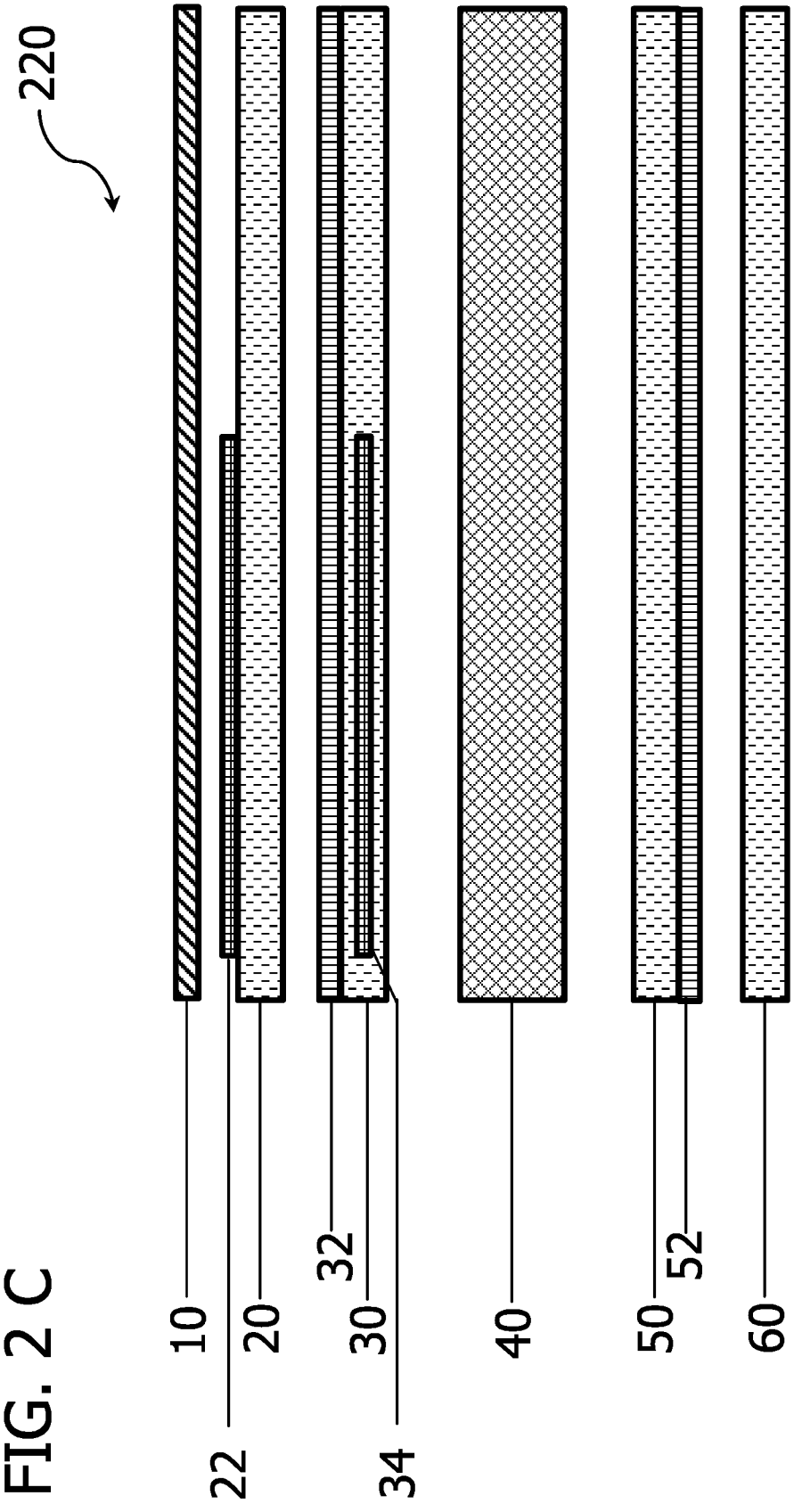

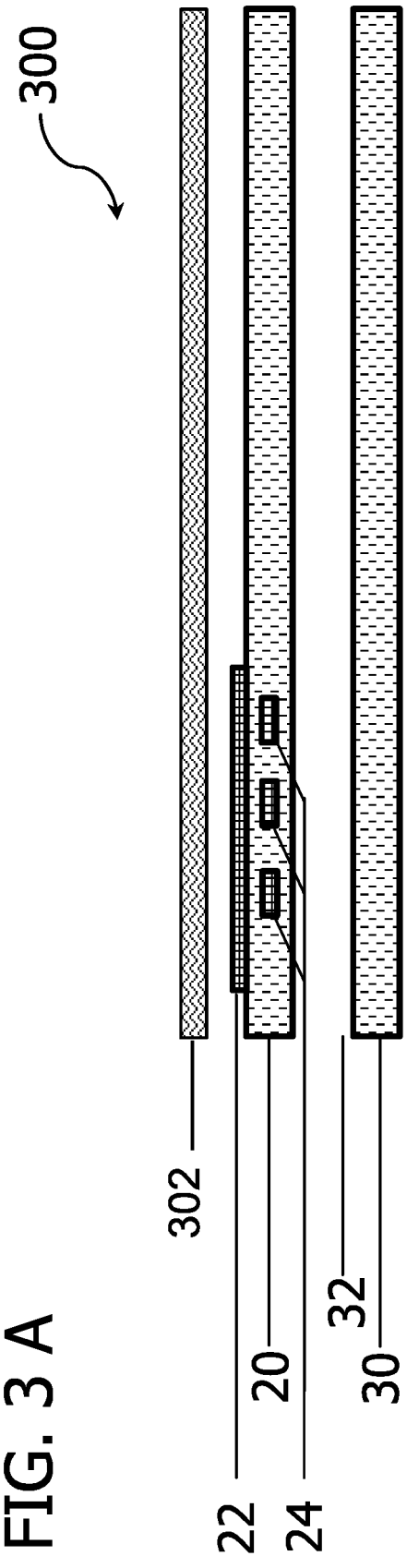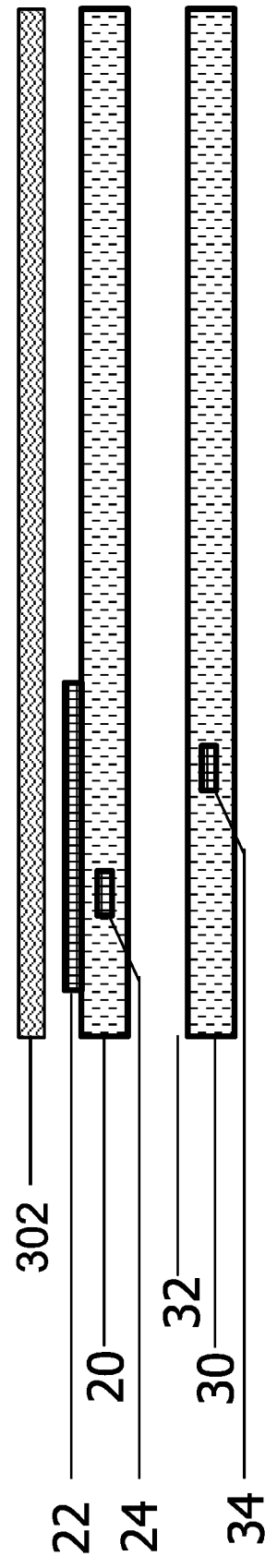

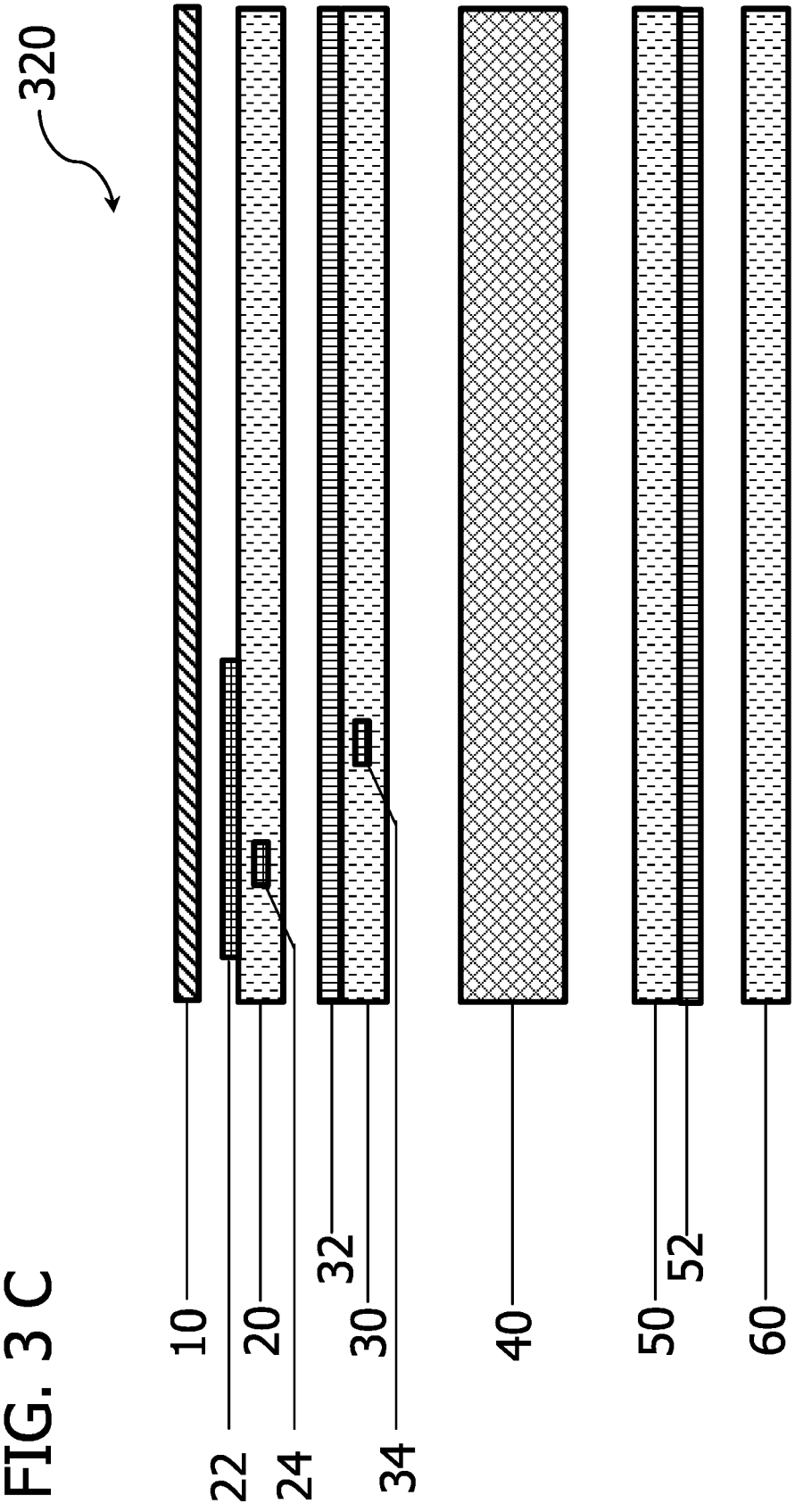

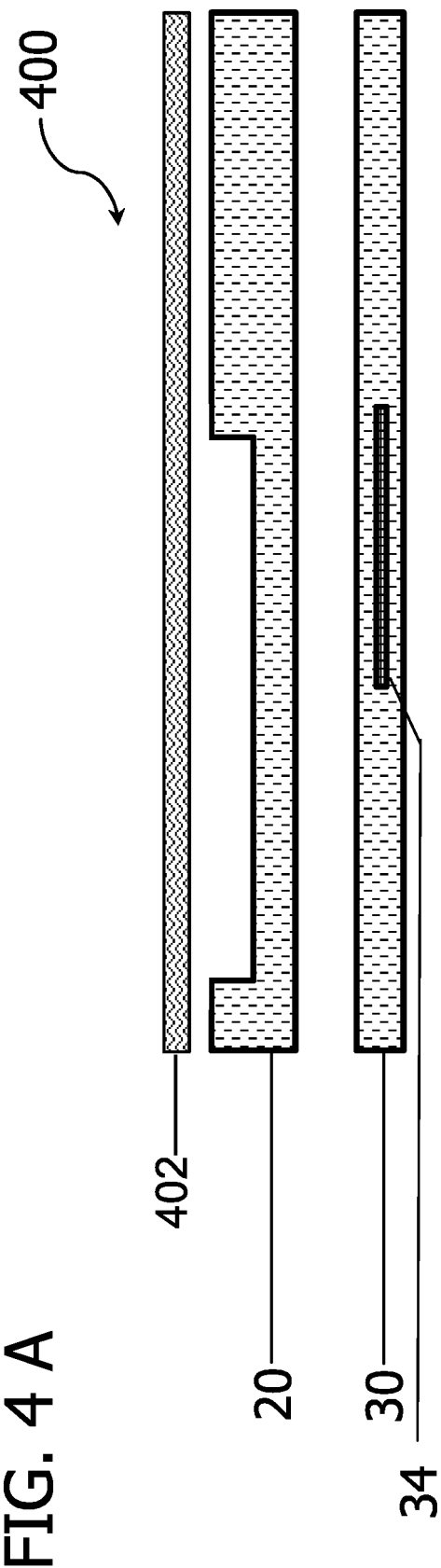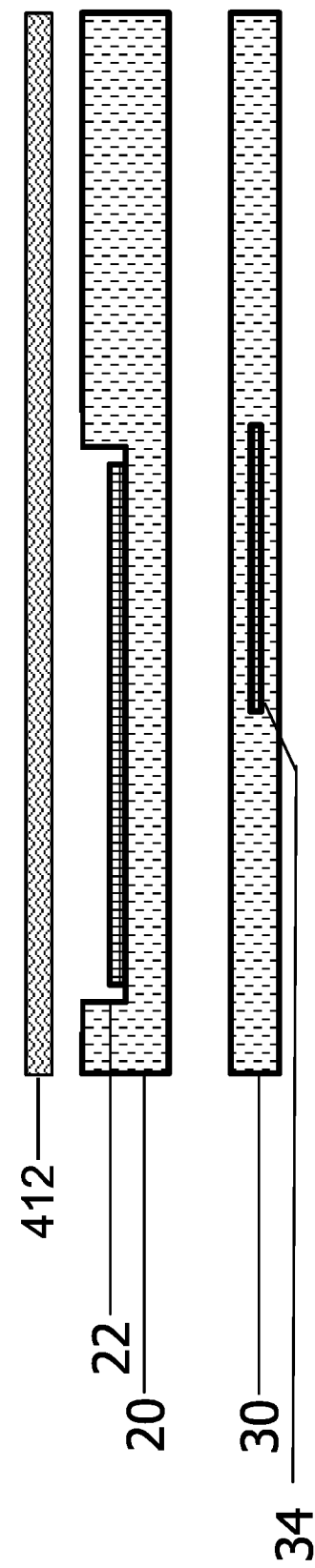
FIG. 4 A
FIG. 4 B

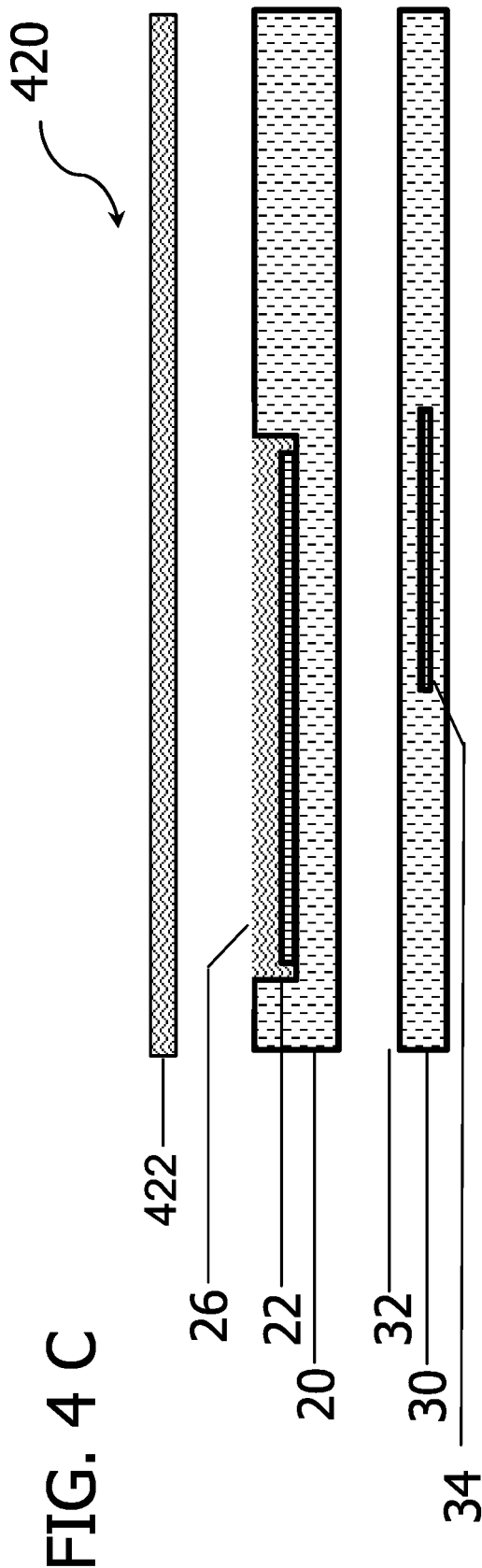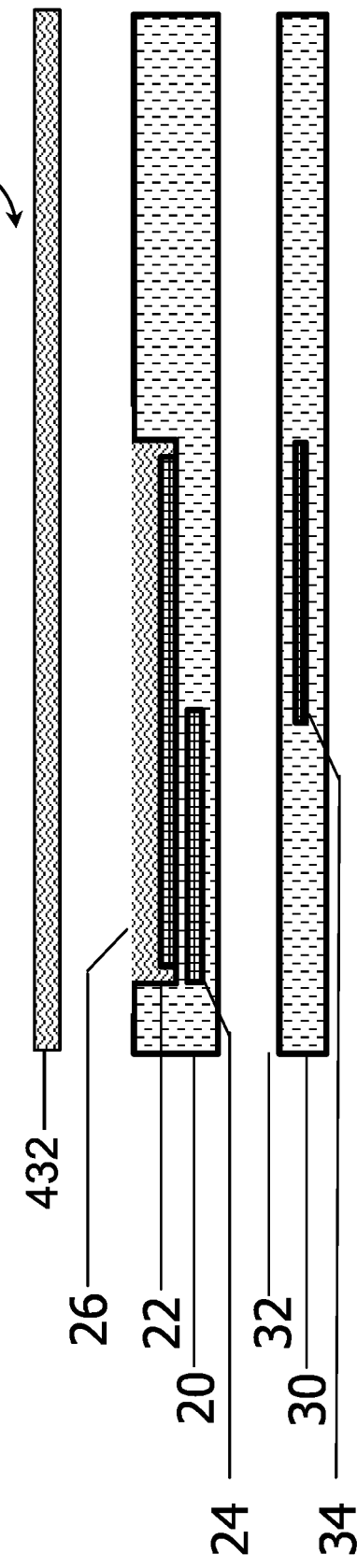

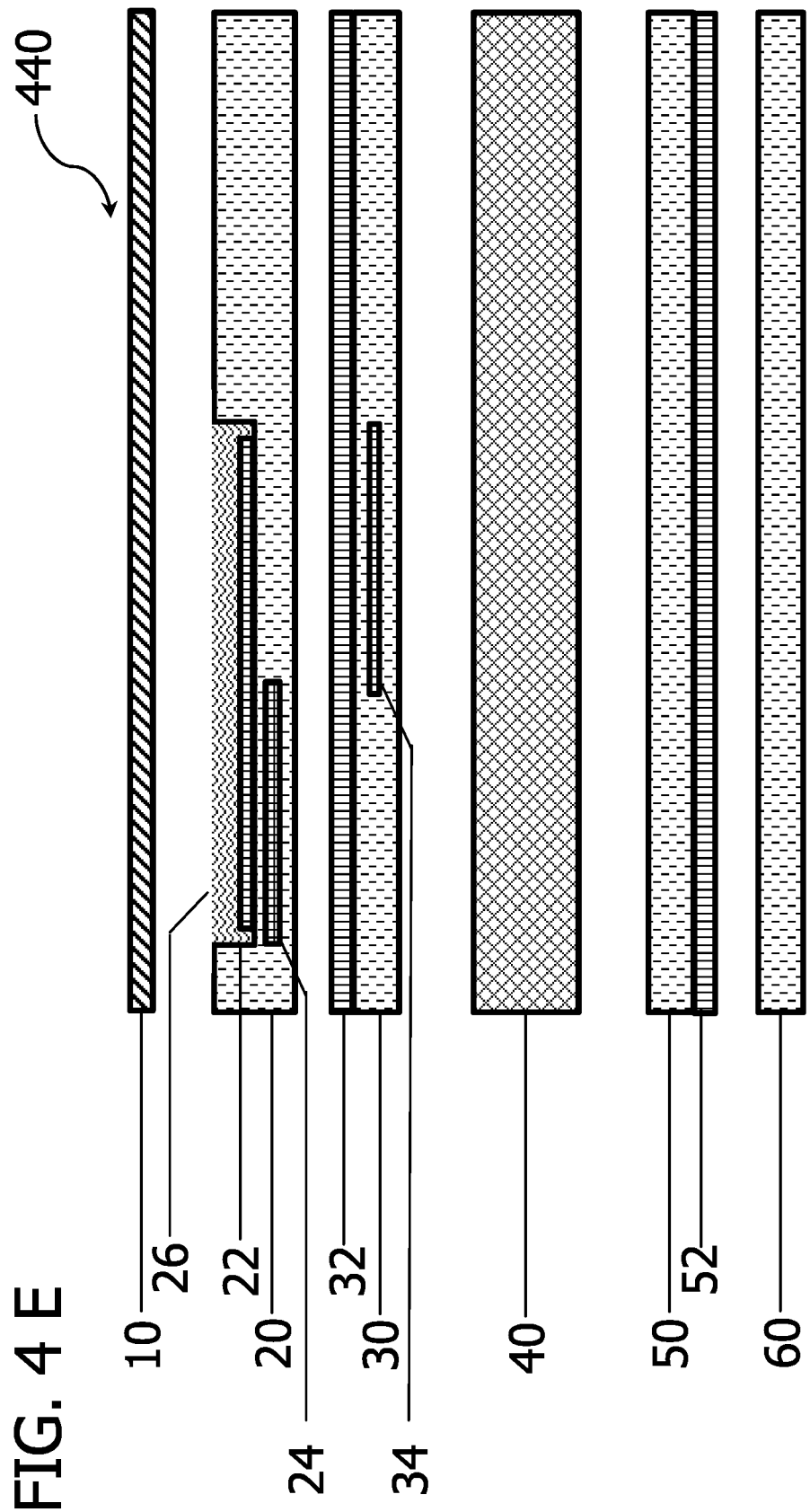

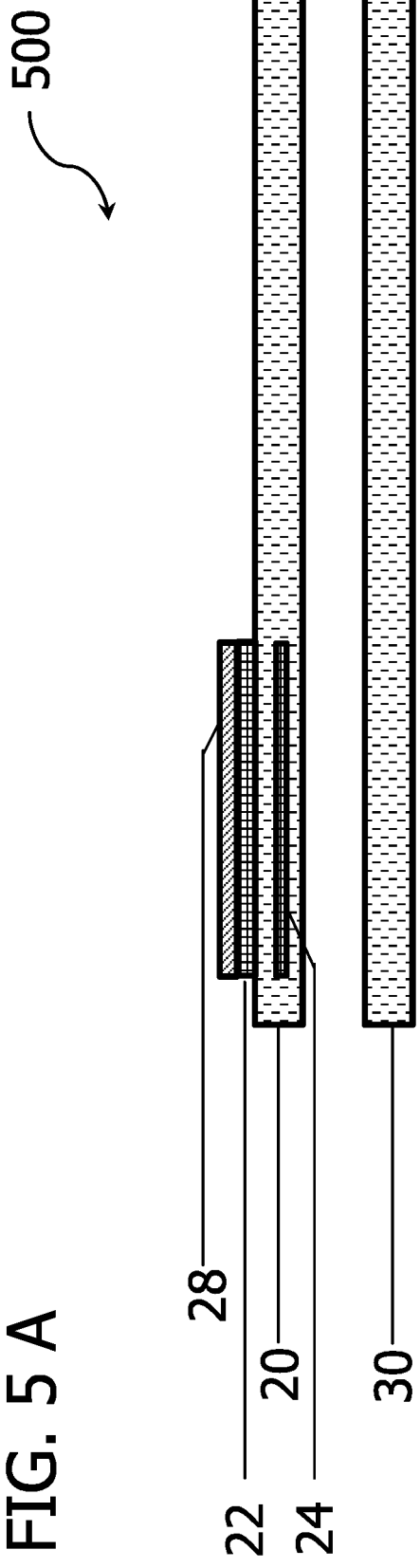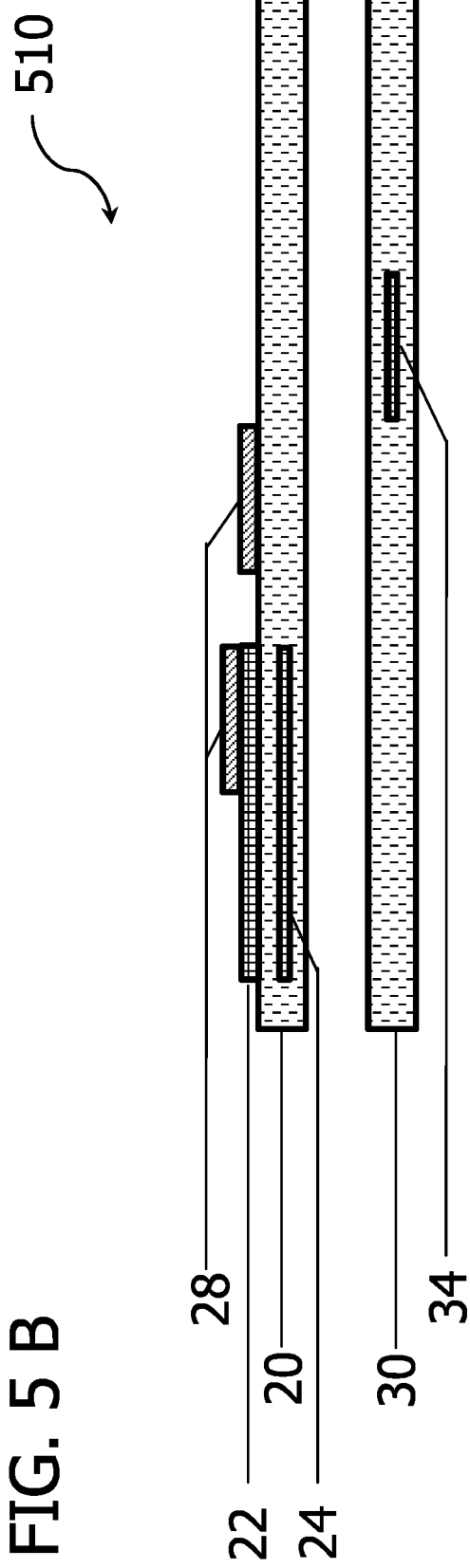

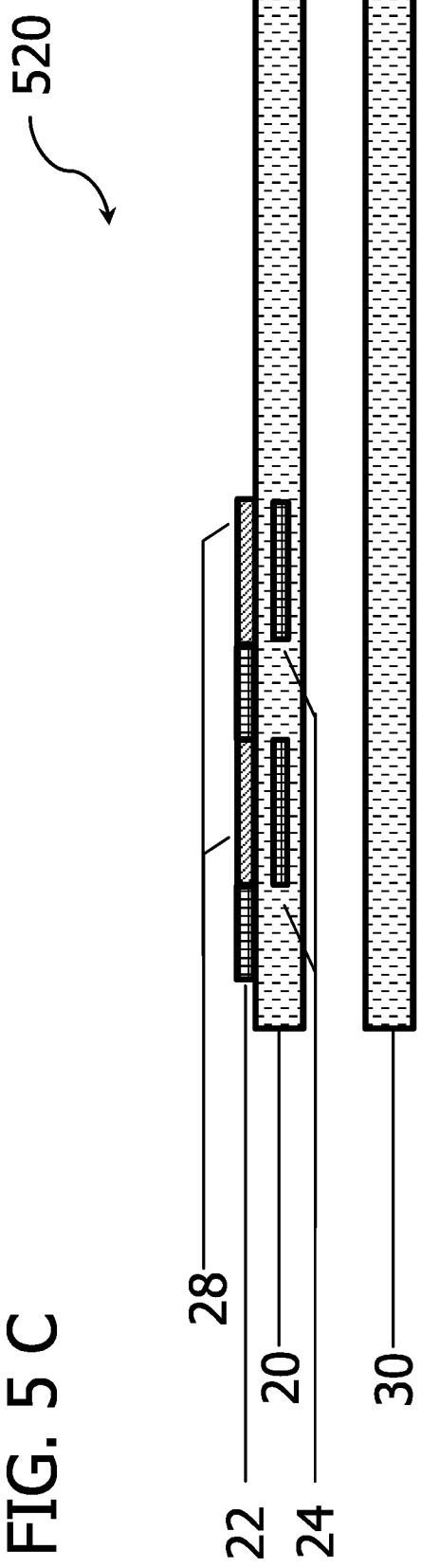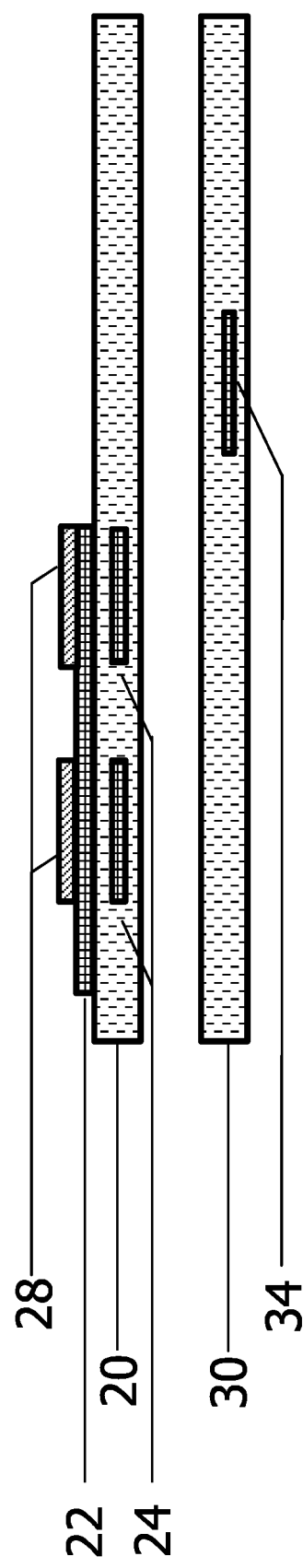

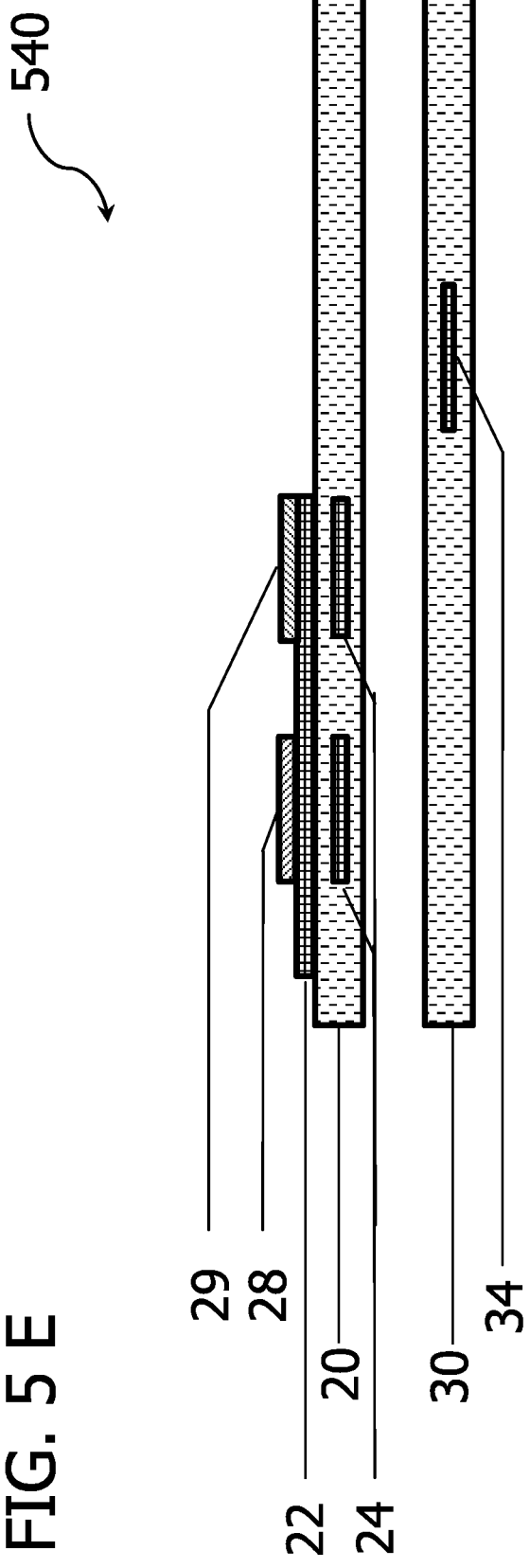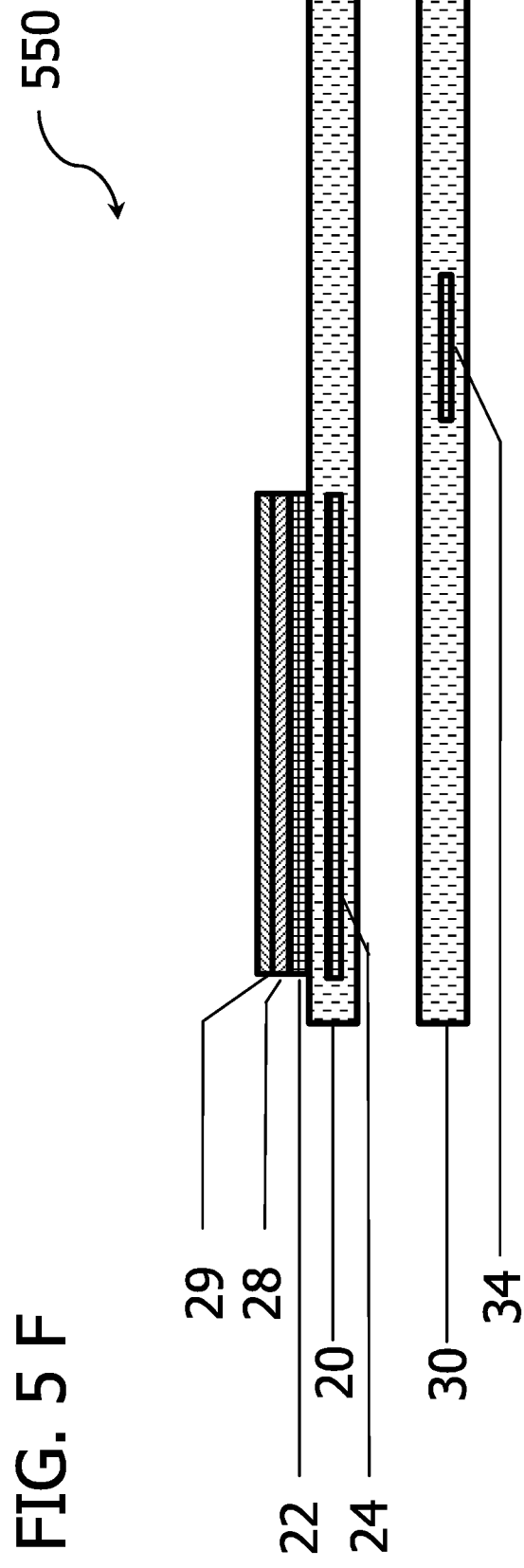

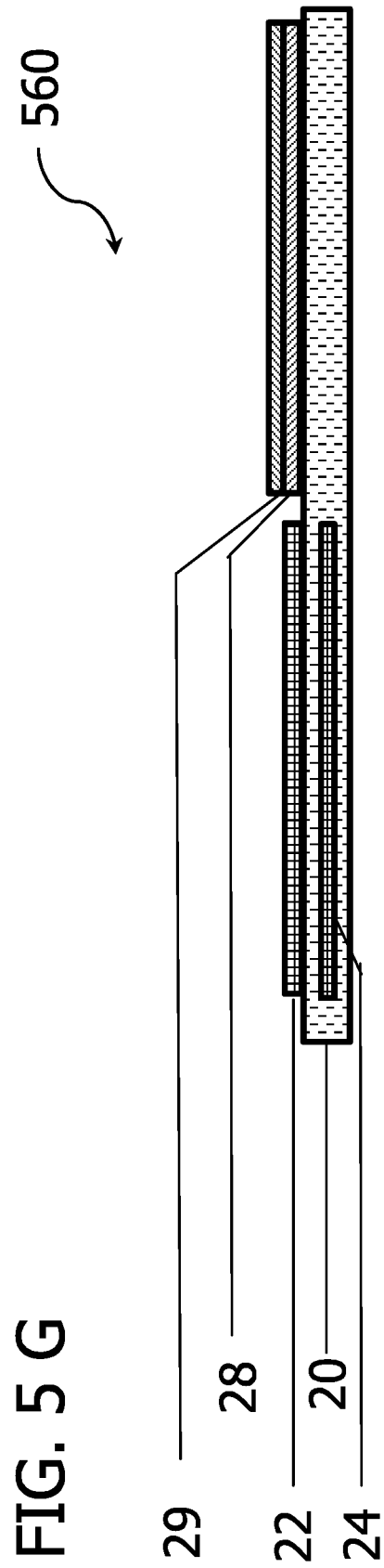

SECURITY INLAY FOR AN IDENTITY DOCUMENT AND METHOD FOR PRODUCING A SECURITY INLAY FOR AN IDENTITY DOCUMENT

CROSS-REFERENCE TO RELATED APPLICATIONS

This application is a National Stage application of International Application No. PCT/EP2018/059814 filed Apr. 18, 2018, which claims priority to German Patent Application Serial No. DE 10 2017 004 039.7, filed Apr. 26, 2017 and Chinese Patent Application Serial No. CN 201810226236.5, filed Mar. 19, 2018.

BACKGROUND

Field

There is described herein a security inlay for an identity document having optically recognizable characters. Such security inlays can be used, for example, in passports in the form of a datasheet or in company identity cards, driving licenses, personal identity cards, social security cards as well as in membership cards.

Discussion

The security inlay is suitable both for use in the context of a booklet, for example of a passport, and for an identity document in bank card format, for example according to ISO/IEC 7810.

Such security inlays are typically substantially rectangular in a plan view and comprise optically recognizable characters such as, for example, personal photographs, text fields, ID numbers, national symbols and/or emblems.

Security inlays are used for the purposes of clear identifiability, durability, resistance and counterfeit protection of the identity documents.

In order to increase the counterfeit protection, security inlays for identity documents can be provided with visible features which are difficult or at least complex to copy. Such features serve to make the identity documents difficult to counterfeit and/or to distinguish genuine identity documents from counterfeit identity documents.

Security inlays for identity documents can further have security features which are invisible and/or visible only under certain conditions, for example under irradiation with UV light. Such features likewise serve to make the identity documents difficult to counterfeit and/or to distinguish genuine identity documents from counterfeit identity documents. German patent DE 10 2013 218 861 A1, for example, discloses a semi-finished product for a security document which allows graphical information to be recognized under UV excitation. However, the graphical information only provides an optically recognizable security feature under UV excitation. The graphical information is transparent to light in the visible wavelength range.

European patent EP 2 004 415 B1 discloses the use of a laser engraving as a non-visible security feature for an identity document, wherein the document must, however, be irreversibly damaged in order to expose the laser engraving.

From WO 2005/062978 A2 there is known an identification document having optically variable personalized data. The document comprises a first layer, on which a security feature is arranged, and a second layer which is bonded to the first layer. Laser engravings are formed in the first layer.

From WO 2015/184556 A1 there is known a security element having an at least partially transparent multilayer substrate on which three at least partially overlapping images are arranged. One of the layers can have a window in which two of the images are arranged.

From WO 2011/020537 A1 there is known an identification card having a polymer carrier and a transparent plastics film arranged thereon. A color image is printed on the plastics film, and a grayscale image is burned into the plastics film by means of a laser beam. The color image and the grayscale image are thereby superimposed. The color image is permeable to infrared radiation. A transparent laminate is provided to protect the color image.

Despite existing solutions, there continues to be a need for an improved security inlay for an identity document for avoiding the described disadvantages.

Accordingly, the object is to provide an improved security inlay for an identity document and a method for producing an improved security inlay for an identity document. Unauthorized reproduction of the security inlay by third parties is to be made difficult, and it is to be possible to verify the integrity of the identity document by means of optically recognizable characters without damaging the identity document.

SUMMARY

This object is achieved by a device according to claim 1, a corresponding method according to claim 14. Advantageous embodiments are defined by the dependent claims.

According to a first aspect, the security inlay having optically recognizable characters for an identity document comprises a first transparent layer and a second transparent layer. On the first transparent layer there is located a color coating. The color coating is transparent to infrared light. The first transparent layer and the second transparent layer are bonded together. At least one of the transparent layers comprises blackened sections. A first portion of the optically recognizable characters is formed by the blackened sections in at least one of the layers. A second portion of the optically recognizable characters is formed by the color coating. The first and the second portion of the optically recognizable characters are arranged and configured to reflect visible light. Infrared light is reflected by the first portion of the optical characters.

Thus, during irradiation with visible light, the security inlay shows first graphical information, which is formed jointly by the first portion of the optically recognizable characters and the second portion of the optically recognizable characters. Under irradiation with infrared light, the security inlay shows second graphical information which is formed by the first portion of the optical characters.

The first graphical information and the second graphical information can be identical or different graphical information.

In a first example, a first image can be represented by the color coating on the first transparent layer, so that this image is optically recognizable during irradiation with visible light. At the same time, a second image, which in particular is an image that is different from the first image, can be represented by blackened sections in at least one of the layers. This second image can be concealed by the first image, so that it is not optically recognizable during irradiation with visible light. Conversely, the security inlay can show only the second image during irradiation with infrared light. Instead of the second image or in addition to the second image, text information, for example, can also be represented by the blackened sections in at least one of the layers.

In a second example, a first image can be represented by the color coating on the first transparent layer and a second image can be represented by blackened sections in at least one of the layers, without the first image concealing the second image. Thus, during irradiation with visible light, the first and the second image are visible, and during irradiation with infrared light, only the second image is visible.

In a third example, a first image can be represented by the color coating on the first transparent layer and a second image can be represented by blackened sections in at least one of the layers, wherein the first and the second image overlap at least partially from the perspective of an observer. For example, the black portions of a complete image can be formed by the blackened sections in at least one of the layers, while the colored portions of an image are formed by the color coating, so that during irradiation with visible light, the complete image is visible and during irradiation with infrared light, only a partial image is visible.

In a fourth example, a first portion of text or of an image can be represented by the color coating, in particular by a black or cmy-black color coating which is transparent to infrared light, while a second portion of the text or image is represented by the blackened sections in at least one of the transparent layers, so that during irradiation of the security inlay with visible light, all of the text or the complete image is visible and during irradiation of the security inlay with infrared light, only a portion of the text or image is visible.

In a fifth example, text which contains, for example, information about the owner of the security inlay can be represented by omissions in the blackened sections in at least one of the transparent layers. In other words, at least one of the transparent layers has blackened sections which have omissions in particular in the form of letters or other characters, so that during irradiation of the security inlay with infrared light, the letters are recognizable because the blackened sections reflect infrared light but the omissions in the form of the letters or other characters do not reflect infrared light. In other words, the blackened sections show a negative image during irradiation with infrared light. The omissions and/or the blackened sections surrounding them can be concealed, from the perspective of an observer, by a color coating, for example with a cmy-black color coating that is transparent to infrared light, so that they are visible only under infrared light.

An advantage of such a security inlay is that the counterfeit protection is increased and at the same time it is possible to verify that the security inlay is genuine by simply irradiating it with infrared light. In particular because black-colored portions of the optical characters can be formed both by blackened sections in at least one transparent layer and by black, in particular cmy-black, portions of the color coating, it is considerably more difficult for unauthorized third parties to produce a copy of the security inlay that is not recognizable as a counterfeit, in particular under infrared light.

The color coating can comprise color components from the starting colors cyan, magenta and yellow.

The color coating can be applied to the first transparent layer by means of ink-jet printing.

An advantage of the use of the color components of cyan, magenta and yellow is that, in a variant, it is possible at least partially to dispense with the use of black color components for producing the color coating without thereby limiting the available color spectrum. The black portions of a complete image that are required in printing processes known as prior art (cyan-magenta-yellow-black printing process, CMYK printing process, according to ISO 2846) to produce a true-color complete image can be formed by the blackened sections in at least one of the layers. It is thus possible to dispense at least partially with the use of black color components in the color coating.

Furthermore, by combining the color components of cyan, magenta and yellow it is possible to form a cmy-black color coating which is transparent in particular to infrared light.

At least one of the transparent layers is to be capable of being blackened at least partially by the action of at least one beam of laser light. To that end, the transparent layers can comprise additives, in particular carbon-based additives. By the action of a beam of laser light it is thus possible purposively to produce blackened sections, in particular charred sections, in a desired intensity.

An advantage of the use of such blackened sections in a security inlay for an identity document is that an unauthorized third party who intends to counterfeit such a security inlay is unable to determine, or can determine only with difficulty, in which layer a concrete blackened section is located without damaging the security inlay. In addition, the blackened sections can have different reflection properties, in particular under irradiation with infrared light, than the color coating and thus contribute further to the counterfeit protection and to the verifiability of the integrity of the security inlay. The use of laser beams permits precise and time-efficient production of the blackened sections.

In a variant, the security inlay can comprise a first UV color coating which is located on the first layer and/or on the color coating. The first UV color coating reflects at least UV light in a first wavelength range. A third portion of the optically recognizable characters can be formed by the first UV color coating.

In a further variant, the security inlay can further comprise a second UV color coating located on the first layer and/or on the color coating and/or on the first UV color coating. The second UV color coating reflects at least UV light in a second wavelength range. A fourth portion of the optically recognizable characters can be formed by the second UV color coating.

The third and/or the fourth portion of the optically recognizable characters can show the same graphical information as the first and/or the second portion of the optically recognizable characters and/or different graphical information from the first and/or second portion of the optically recognizable characters. For example, a facial image of an owner of the security inlay can be shown.

The first UV color coating and/or the second UV color coating can be transparent to visible light and/or infrared light.

In a variant, the first UV color coating and/or the second UV color coating can be multicolored UV color coatings. In particular, the UV color coatings can comprise color components of red, green, blue and white (RGBW) or of cyan, magenta, yellow and/or black (CMYK), which each reflect UV light. The use of further color components for the first and/or for the second UV color coating is possible in a further development.

The first UV color coating and/or the second UV color coating can be arranged and configured to show to an observer of the security inlay during irradiation of the security inlay with UV light multicolored graphical information, for example a facial image of the cardholder, which is not visible to the observer in particular during irradiation of the security inlay with only visible light.

In a variant, the first and/or the second UV color coating can be bifluorescent. In particular, the first UV color coating can impart to the observer of the security inlay a first color impression during irradiation of the security inlay with UV light of a first wavelength and can impart a second color impression during irradiation of the security inlay with UV light of a third wavelength. Furthermore, the second UV color coating can impart to the observer of the security inlay a third color impression during irradiation of the security inlay with UV light of a second wavelength and can impart a fourth color impression during irradiation of the security inlay with UV light of a fourth wavelength. The first, second, third and fourth color impressions can be different from one another or at least partially identical.

For example, the first UV color coating can impart to the observer of the security inlay during irradiation of the security inlay with UV light of a first wavelength of preferably 365 nm a color impression of the color components red, green, blue and white, and can impart a color impression of the color components green and red during irradiation of the security inlay with UV light of a third wavelength of preferably 254 nm.

In another example, the second UV color coating can impart to the observer of the security inlay during irradiation of the security inlay with UV light of a second wavelength of preferably 365 nm a blue color impression, and can impart a red color impression during irradiation of the security inlay with UV light of a fourth wavelength of preferably 313 nm.

An advantage of the first UV color coating and/or of the second UV color coating is that further security features which become visible under irradiation of the security inlay with UV light can be added to the security inlay by producing a third and/or fourth portion of the optical characters. If both a first UV color coating and a second UV color coating which reflect UV light in different wavelength ranges are used, this allows the counterfeit protection of the security inlay to be increased further, in particular since replication of the security inlay is made even more difficult.

In one embodiment, the security inlay can further comprise a transparent cover layer of polycarbonate, polyethylene terephthalate or polyethylene terephthalate glycol.

An advantage of the cover layer is that it protects the security inlay from negative environmental influences such as, for example, the penetration of moisture, or it protects against mechanical damage such as, for example, scratching of the security inlay.

The security inlay further comprises a lacquer layer which is applied to the first transparent layer and/or to the color coating. The lacquer layer can moreover also be applied to the first UV color coating and/or to the second UV color coating. For example, the lacquer layer can completely cover a surface of the first transparent layer and a color coating located thereon or, in another example, it can cover only a color coating located on the first transparent layer, and/or the first UV color coating and/or the second UV color coating. In a further development, the lacquer layer can cover the color coating located on the first transparent layer, and/or the first UV color coating and/or the second UV color coating and a portion of the first transparent layer. For example, the area covered by the lacquer layer can be from 5 to 20 percent larger than the area of the color coating located on the first transparent layer and/or of the first UV color coating and/or of the second UV color coating.

The color coating and/or the first UV color coating and/or the second UV color coating can be completely enclosed/encircled by the lacquer layer and the first transparent layer, so that the lacquer layer and the first transparent layer in conjunction surround the color coating and/or the first UV color coating and/or the second UV color coating completely.

The lacquer layer can be transparent to visible light and/or infrared light and/or UV light. The lacquer layer can comprise a manufacturing material which is the same as the manufacturing material of the first transparent layer. At least a portion of the lacquer layer can comprise a manufacturing material of (meth)acrylate, polyester acrylate or urethane acrylate. Furthermore, a manufacturing material of the lacquer layer can in particular be a heat- and/or UV-curable manufacturing material.

The lacquer layer can have a thickness of less than 100 µm, for example a thickness of from 12 µm to 80 µm. In particular, the lacquer layer can have a thickness of from 30 µm to 80 µm. Furthermore, the lacquer layer can be capable of being applied to the first transparent layer by means of an ink-jet printer. The temperature resistance of the lacquer layer can be greater than the temperature resistance of one of the transparent layers. In particular, the temperature resistance of the lacquer layer can be greater than the temperature resistance of the first transparent layer.

The lacquer layer can be applied to the first transparent layer optionally in the form of a rectangle, a star or with the contour of a national symbol or emblem. In a variant, the lacquer layer can be applied to the first transparent layer with the contour of a facial image congruently or enlarged relative to the facial image.

An advantage of the lacquer layer is that it cannot be removed from the first transparent layer, or can be removed only with difficulty, and thus improves the counterfeit protection of the security inlay. In addition, the lacquer layer can protect the first transparent layer from scratching and/or wear.

The security inlay can further comprise a third transparent layer, which in particular is to be blackened by laser light, and/or a fourth transparent layer, which in particular is to be blackened by laser light.

An advantage of further transparent layers, which in particular are to be blackened by laser light, is that they further increase the counterfeit protection. A totality of optically recognizable characters perceived from the perspective of an observer can thus be dislocated to a plurality of transparent layers as well as a color coating and/or a plurality of UV color coatings.

At least one of the transparent layers can have an enlarged base area compared to another transparent layer, wherein base area is to be understood as meaning the dimensions of the security inlay, or individual transparent layers, from the point of view of an observer of the security inlay. The enlarged base area of the at least one transparent layer can advantageously serve for bonding the security inlay with a booklet, in particular a passport. The part of the at least one transparent layer that is enlarged compared to another transparent layer can thereby be used for fixing the security inlay in the booklet.

A first background color coating can be located on the second layer. A second background color coating can be located on the fourth layer.

An advantage of the use of background color coatings is a contribution to the optically perceivable total information of the security inlay that can be manufactured efficiently. Both the first and the second background color coatings can comprise security features which further increase the counterfeit protection of the security inlay.

The first and/or the second background color coating can be produced by an offset printing process.

The security inlay can further comprise an insert which has at least a first, in particular opaque and/or optically active, insert layer. The insert can be located, for example, between the second and the third transparent layers.

In a variant, the insert can be located in a recess of the second and/or third transparent layer.

In one embodiment, the insert can comprise a second, in particular opaque and/or optically active, insert layer. An arrangement of electronic components, in particular antenna modules and/or RFID chips, can be located between the first and the second insert layers. Embodiments with further insert layers are possible.

An advantage of the use of an antenna module and/or RFID chip is that it further increases the counterfeit protection and the verifiability of the integrity of the security inlay by means of electronic reading devices for RFID chips, which are known as prior art.

At least one of the layers can comprise a hologram element which is visible to an observer of the security inlay and has a visual-holographic effect. The visual-holographic effect can be optically recognizable both under visible light and under invisible light, in particular under infrared or ultraviolet light.

In a variant, the hologram element can be transparent to UV light.

The hologram element, at least from the perspective of an observer, can at least partially overlap with a portion of the optically recognizable characters.

In a further development, the hologram element can also be arranged between the transparent layers or between a transparent layer and the insert. In particular, the hologram element can be arranged the first transparent layer and the second transparent layer or between the second transparent layer and the insert.

An advantage of the use of a hologram element is that it further increases the counterfeit protection and the verifiability of the integrity of the security inlay.

The transparent layers and/or the insert and/or the cover layer can be bonded together by lamination.

An advantage of laminating the at least two transparent layers is that it makes it difficult to separate the layers from one another, for example in order to produce a counterfeit of the security inlay by an unauthorized third party, without damaging the inlay.

At least one transparent layer of the security inlay can be manufactured from polycarbonate or polyethylene terephthalate. In a variant, the security inlay can be manufactured wholly from polycarbonate or polyethylene terephthalate.

Advantages of manufacturing the security inlay from polycarbonate or polyethylene terephthalate arise, for example, from the resistance, the lightness and the flexibility of the materials.

The color coating and/or the first UV color coating and/or the second UV color coating and/or the first background color coating and/or the second background color coating can be formed from solvent-containing, in particular pigment-based, inks. The solvent-containing, in particular pigment-based, inks can be suitable for dissolving and at least partially penetrating a surface of polycarbonate or polyethylene terephthalate during an application process.

An advantage of the use of such solvent-containing inks to form the color coating or the background color coatings is that it increases the counterfeit protection of the security inlays. For example, it is thus difficult for an unauthorized third party to remove the color coating from the first transparent layer, for example for the purpose of replacing the first color coating.

The color coating and/or the first UV color coating and/or the second UV color coating and/or the first background color coating and/or the second background color coating can comprise forensic markers, in particular silicon, silicon dioxide, mica, titanium oxide and/or tin oxide.

An advantage of the use of such forensic markers is the verifiability of the integrity of a security inlay. Although such forensic markers typically cannot be recognized with the naked eye, it can be determined by means of a purposive examination of the security inlay on the basis of the forensic markers whether it is an original document or a counterfeit.

According to the invention, the first transparent layer of the security inlay has a depression. The color coating and/or the first UV color coating and/or the second UV color coating can be located at least partially in the region of the depression of the first transparent layer. A transparent polymer material can further be located in the depression, so that at least a portion of the color coating and/or of the first UV color coating and/or of the second UV color coating is enclosed by the first layer and the polymer material. The polymer material can in particular be heat- and/or UV-curable.

According to the invention, the depression of the first transparent layer is filled with the lacquer layer.

In one embodiment, the polymer material and/or the lacquer layer and/or at least one of the transparent layers can comprise an additive which reflects UV light in a first and/or in a second wavelength range, for example the polymer material can comprise color pigments which reflect UV light.

For example, the lacquer layer and/or the transparent cover layer and/or at least one of the transparent layers can comprise nanoscale luminophores which are configured to reflect UV light of a predetermined wavelength. In one example, the nanoscale luminophores which are incorporated in the lacquer layer of the security inlay can reflect UV light of a predetermined wavelength so that, when the security inlay is illuminated with UV light of the predetermined wavelength, a portion of the color coating and/or of the first UV color coating and/or of the second UV color coating is concealed for an observer of the security inlay.

In a further development, the polymer material can comprise forensic markers, in particular silicon, silicon dioxide, mica, titanium oxide and/or tin oxide.

In one embodiment, the depression can be so filled with the polymer material or the lacquer layer that this is flush with the surface of the first transparent layer, so that a planar overall surface without raised and/or depressed portions is obtained.

An advantage of a depression in which the color coating and/or the first UV color coating and/or the second UV color coating are at least partially enclosed by the first layer and a polymer material or a lacquer layer is that it increases the counterfeit protection, since it makes it considerably more difficult for an unauthorized third party to remove or replicate the color coating and/or the first UV coating and/or the second UV coating, for example for the purpose of counterfeiting the security inlay, without damaging the security inlay.

A method for producing a security inlay having optically recognizable characters for an identity document comprises the steps:

providing a first transparent layer,
providing a second transparent layer, producing a first portion of the optically recognizable characters by blackened sections in at least one layer by means of a beam of laser light, producing a second portion of the optically recognizable characters by applying a color coating to the first layer.

The order in which the steps are carried out is not fixed. In particular, in one exemplary embodiment, first the second portion of the optically recognizable characters and then the first portion of the optically recognizable characters can be produced.

In a variant, the method for producing a security inlay having optically recognizable characters for an identity document further comprises at least one of the steps:

producing a depression in the first layer, in particular by pressing and/or embossing and/or milling, filling the depression with transparent, in particular heat- and/or UV-curable polymer material or with a lacquer layer, providing a cover layer, bonding at least one of the transparent layers with the cover layer and/or applying the lacquer layer to the first transparent layer, producing a third portion of the optically recognizable characters by applying to the first layer and/or to the color coating a first UV color coating which reflects at least UV light in a first wavelength range, producing a fourth portion of the optically recognizable characters by applying to the first layer and/or to the color coating and/or to the first UV color coating a second UV color coating which reflects at least UV light in a second wavelength range.

Bonding of the layers can take place by a laminating process.

For producing the color coating and/or the first UV color coating and/or the second UV color coating there can be used solvent-containing, in particular pigment-based, inks which dissolve and at least partially penetrate a surface of the first layer, which in particular is manufactured from polycarbonate or polyethylene terephthalate.

According to the invention, the lacquer layer is applied to the first transparent layer while the color coating are not yet completely dried/cured. The lacquer layer can moreover be applied to the first transparent layer while the first UV color coating and/or the second UV color coating are not yet completely dried/cured. An advantage thereof is improved adhesion or bonding between the (UV) color coatings and the lacquer layer, so that it becomes more difficult to detach the lacquer layer from the first transparent layer having the color coatings without damaging the security inlay. The security of the inlay can thereby be improved further.

A device for producing a security inlay for an identity document having optically recognizable characters comprises a laser device, a printing device and optionally a laminating device. The laser device is configured and arranged to produce blackened sections at least in a first and/or second transparent layer by means of a beam of laser light. The printing device is configured and arranged to apply to the first layer a color coating and/or a UV color coating which is transparent in particular to infrared light. In a further development, the printing device can further be configured to apply a lacquer layer to the first layer. Alternatively, there can be provided a second printing device or a lacquering device which is configured to apply the lacquer layer to the first layer. The optional laminating device is configured and arranged to bond the cover layer with the first transparent layer.

An advantage of the device for producing a security inlay is that a security inlay that in itself is finished, for example in ID 1 format or in ID 3 format, in contrast to printing in sheet format, can be personalized with high counterfeit protection by being printed, lasered and then provided with a cover layer. Alternatively to the cover layer, a lacquer layer can also be applied.

According to a second aspect, the security inlay having optically recognizable characters for an identity document comprises at least a first transparent layer and a second transparent layer. On the first transparent layer there is located a color coating. There is further located on the first layer and/or on the color coating a first UV color coating which at least reflects UV light at least in a first wavelength range. The first transparent layer and the second transparent layer are bonded together. At least one of the transparent layers comprises blackened sections. A first portion of the optically recognizable characters is formed by the blackened sections in at least one of the layers. A second portion of the optically recognizable characters is formed by the color coating. A third portion of the optically recognizable characters is formed by the UV color coating. The first and the second portions of the optically recognizable characters reflect visible light.

An advantage of such a security inlay is that, by the combination of three differently formed portions of optically recognizable characters, optically complete information is implemented which, by irradiation with light of different wavelengths (visible light, UV light), can show different security features.

In a first example, a first image can be represented by the color coating on the first transparent layer, so that this image is optically recognizable during irradiation with visible light. At the same time, a second image, which in particular is an image that is different from the first image, can be represented by blackened sections in at least one of the layers, so that this image is likewise optically recognizable during irradiation with visible light. A third image can be represented by the first UV color coating, so that the third image is visible during irradiation of the image with UV light of a first wavelength.

In a second example, a first image can be represented by the color coating on the first transparent layer and a second image can be represented by blackened sections in at least one of the layers, wherein the first and the second image at least partially overlap from the perspective of an observer. For example, the black portions of a complete image can be formed by the blackened sections in at least one of the layers, while the colored portions of the complete image are formed by the color coating, so that the complete image is visible during irradiation with visible light. A third image can be represented by the first UV color coating, so that the third image is visible during irradiation of the security inlay with UV light of a first wavelength.

Instead of an image, any other type of optically recognizable characters, in particular text, can be represented.

In a variant, the security inlay can further comprise a second UV color coating located on the first layer and/or on the color coating and/or on the first UV color coating. The second UV color coating reflects at least UV light in a second wavelength range. A fourth portion of the optically recognizable characters can be formed by the second UV color coating.

In one example, a first image can be represented by the color coating on the first transparent layer and a second image can be represented by blackened sections in at least one of the layers, wherein the first and the second image at least partially overlap from the perspective of an observer. For example, the black portions of a complete image can be formed by the blackened sections in at least one of the layers, while the colored portions of the complete image are formed by the color coating, so that the complete image is visible during irradiation with visible light. A third image can be represented by the first UV color coating, so that the third image is visible only during irradiation of the security inlay with UV light of a first wavelength. A fourth image can be represented by the second UV color coating, so that the fourth image is visible only during irradiation of the security inlay with UV light of a second wavelength.

The color coating and/or the first UV color coating and/or the second UV color coating can be transparent to visible and/or infrared light. In a variant, only the first portion of the optically recognizable characters, which is formed by the blackened sections, reflects infrared light.

In one example, during irradiation with visible light the security inlay shows first graphical information which is formed jointly by the first portion of the optically recognizable characters and the second portion of the optically recognizable characters. Under irradiation with infrared light, the security inlay shows second graphical information which is formed only by the first portion of the optically recognizable characters. Under irradiation with UV light of a first wavelength, third graphical information which is formed from the third portion of the optically recognizable characters is visible. Under irradiation with UV light of a second wavelength, fourth graphical information which is formed from the fourth portion of the optically recognizable characters is visible.

The third and/or the fourth portion of the optically recognizable characters can show the same graphical information as the first and/or the second portion of the optically recognizable characters and/or graphical information that is different from the first and/or second portion of the optically recognizable characters. For example, a facial image of an owner of the security inlay can be shown.

An advantage of such a security inlay is that the counterfeit protection is increased and at the same time it is possible to verify that the security inlay is genuine by simply irradiating it with infrared light. In particular because black-colored portions of the optical characters can be formed both by blackened sections in at least one transparent layer and by black, in particular cmy-black, portions of the color coating, it is considerably more difficult for unauthorized third parties to produce a copy of the security inlay that is not recognizable as a counterfeit, in particular under infrared light and/or UV light.

In a variant, the first UV color coating and/or the second UV color coating can be multicolored UV color coatings. In particular, the UV color coatings can comprise color components of red, green, blue and white (RGBW) or of cyan, magenta, yellow and/or black (CMYK), which each reflect UV light. The use of further color components for the first and/or for the second UV color coating is possible in a further development.

The first UV color coating and/or the second UV color coating can be arranged and configured to show to an observer of the security inlay during irradiation of the security inlay with UV light multicolored graphical information, for example a facial image of the cardholder, which is not visible to the observer in particular during irradiation of the security inlay with only visible light.

In a variant, the first and/or the second UV color coating can be bifluorescent. In particular, the first UV color coating can impart to the observer of the security inlay a first color impression during irradiation of the security inlay with UV light of a first wavelength and can impart a second color impression during irradiation of the security inlay with UV light of a third wavelength. Furthermore, the second UV color coating can impart to the observer of the security inlay a third color impression during irradiation of the security inlay with UV light of a second wavelength and can impart a fourth color impression during irradiation of the security inlay with UV light of a fourth wavelength. The first, second, third and fourth color impressions can be different from one another or at least partially identical.

For example, the first UV color coating can impart to the observer of the security inlay during irradiation of the security inlay with UV light of a first wavelength of preferably 365 nm a color impression of the color components red, green, blue and white, and can impart a color impression of the color components green and red during irradiation of the security inlay with UV light of a third wavelength of preferably 254 nm.

In another example, the second UV color coating can impart to the observer of the security inlay during irradiation of the security inlay with UV light of a second wavelength of preferably 365 nm a blue color impression, and can impart a red color impression during irradiation of the security inlay with UV light of a fourth wavelength of preferably 313 nm.

The color coating can comprise color components of the starting colors cyan, magenta and yellow.

The color coating and/or the first UV color coating and/or the second UV color coating can each be applied by means of ink-jet printing.

An advantage of the use of the color components of cyan, magenta and yellow is that, in a variant, it is possible at least partially to dispense with the use of black color components for producing the color coating without thereby limiting the available color spectrum. The black portions of a complete image that are required in printing processes known as prior art (cyan-magenta-yellow-black printing process, CMYK printing process, according to ISO 2846) to produce a true-color complete image can be formed by the blackened sections in at least one of the layers. It is thus possible to dispense at least partially with the use of black color components in the color coating.

Furthermore, by combining the color components of cyan, magenta and yellow it is possible to form a cmy-black color coating which is transparent in particular to infrared light.

At least one of the transparent layers is to be capable of being blackened at least partially by the action of at least one beam of laser light. To that end, the transparent layers can comprise additives, in particular carbon-based additives. By the action of a beam of laser light it is thus possible purposively to produce blackened sections, in particular charred sections, in a desired intensity.

An advantage of the use of such blackened sections in a security inlay for an identity document is that an unauthorized third party who intends to counterfeit such a security inlay is unable to determine, or can determine only with difficulty, in which layer a concrete blackened section is located, without damaging the security inlay. In addition, the blackened sections can have different reflection properties, in particular for infrared light, than the color coating and thus contribute further to the counterfeit protection and to the verifiability of the integrity of the security inlay. The use of laser beams permits precise and time-efficient production of the blackened sections.

In one embodiment, the security inlay can further comprise a transparent cover layer of polycarbonate, polyethylene terephthalate or polyethylene terephthalate glycol.

An advantage of the cover layer is that it protects the security inlay from negative environmental influences such as, for example, the penetration of moisture, or it protects against mechanical damage such as, for example, scratching of the security inlay.

Alternatively or in addition to the transparent cover layer, the security inlay can comprise a lacquer layer which is applied to the first transparent layer and/or to the color coating and/or to the first UV color coating and/or to the second UV color coating. For example, the lacquer layer can completely cover a surface of the first transparent layer and a color coating located thereon or, in another example, it can cover only a color coating located on the first transparent layer, and/or the first UV color coating and/or the second UV color coating. In a further development, the lacquer layer can cover the color coating located on the first transparent layer, and/or the first UV color coating and/or the second UV color coating and a portion of the first transparent layer. For example, the area covered by the lacquer layer can be from 5 to 20 percent larger than the area of the color coating located on the first transparent layer and/or of the first UV color coating and/or of the second UV color coating.

The color coating and/or the first UV color coating and/or the second UV color coating can be completely enclosed/encircled by the lacquer layer and the first transparent layer, so that the lacquer layer and the first transparent layer in conjunction surround the color coating and/or the first UV color coating and/or the second UV color coating completely.

The lacquer layer can be transparent to visible light and/or infrared light and/or UV light. The lacquer layer can comprise a manufacturing material which is the same as a manufacturing material of the first transparent layer. At least a portion of the lacquer layer can comprise a manufacturing material of (meth)acrylate, polyester acrylate or urethane acrylate. Furthermore, a manufacturing material of the lacquer layer can in particular be a heat- and/or UV-curable manufacturing material.

The lacquer layer can have a thickness of less than 100 µm, for example a thickness of from 12 µm to 80 µm. In particular, the lacquer layer can have a thickness of from 30 µm to 80 µm. Furthermore, the lacquer layer can be capable of being applied to the first transparent layer by means of an ink-jet printer. The temperature resistance of the lacquer layer can be greater than the temperature resistance of one of the transparent layers. In particular, the temperature resistance of the lacquer layer can be greater than the temperature resistance of the first transparent layer.

The lacquer layer can be applied to the first transparent layer optionally in the form of a rectangle, a star or with the contour of a national symbol or emblem. In a variant, the lacquer layer can be applied to the first transparent layer with the contour of a facial image congruently or enlarged relative to the facial image.

An advantage of the lacquer layer is that it cannot be removed from the first transparent layer, or can be removed only with difficulty, and thus improves the counterfeit protection of the security inlay. In addition, the lacquer layer can protect the first transparent layer from scratching and/or wear.

The security inlay can further comprise a third transparent layer, which in particular is to be blackened by laser light, and/or a fourth transparent layer, which in particular is to be blackened by laser light.

An advantage of further transparent layers, which in particular are to be blackened by laser light, is that they further increase the counterfeit protection. A totality of optically recognizable characters perceived from the perspective of an observer can thus be dislocated to a plurality of transparent layers as well as a color coating and/or a plurality of UV color coatings.

At least one of the transparent layers can have an enlarged base area compared to another transparent layer, wherein base area is to be understood as meaning the dimensions of the security inlay, or individual transparent layers, from the point of view of an observer of the security inlay. The enlarged base area of the at least one transparent layer can advantageously serve for bonding the security inlay with a booklet, in particular a passport. The portion of the at least one transparent layer that is enlarged compared to another transparent layer can thereby be used for fixing the security inlay in the booklet.

A first background color coating can be located on the second layer. A second background color coating can be located on the fourth layer.

The first and/or the second background color coating can be produced by an offset printing process.

An advantage of the use of background color coatings is a contribution to the optically perceivable total information of the security inlay that can be manufactured efficiently. Both the first and the second background color coatings can comprise security features which further increase the counterfeit protection of the security inlay.

The security inlay can further comprise an insert which has at least a first, in particular opaque and/or optically active, insert layer. The insert can be located, for example, between the second and the third transparent layers.

In a variant, the insert can be located in a recess of the second and/or third transparent layer.

In one embodiment, the insert can comprise a second, in particular opaque and/or optically active, insert layer. An arrangement of electronic components, in particular antenna modules and/or RFID chips, can be located between the first and second insert layers. Embodiments with further insert layers are possible.

An advantage of the use of an antenna module and/or RFID chip is that it further increases the counterfeit protection and the verifiability of the integrity of the security inlay by means of electronic reading devices for RFID chips, which are known as prior art.

At least one of the layers can comprise a hologram element which is visible to an observer of the security inlay and has a visual-holographic effect. The visual-holographic effect can be optically recognizable both under visible light and under invisible light, in particular under infrared or ultraviolet light.

In a variant, the hologram element can be transparent to UV light.

The hologram element, at least from the perspective of an observer, can at least partially overlap with a portion of the optically recognizable characters. In a further development, the hologram element can also be arranged between the transparent layers and/or between a transparent layer and the insert. In particular, the hologram element can be arranged between the first transparent layer and the second transparent layer or between the second transparent layer and the insert.

In one exemplary embodiment, the third portion of the optically recognizable characters formed by the first, in particular multicolored, UV print overlies, at least from the perspective of an observer, a hologram element which is arranged between the second transparent layer and the insert.

An advantage of the use of a hologram element is that it further increases the counterfeit protection and the verifiability of the integrity of the security inlay.

The transparent layers and/or the insert and/or the cover element can be bonded together by lamination.

An advantage of laminating the at least two transparent layers is that it makes it difficult to separate the layers from one another, for example in order to produce a counterfeit of the security inlay by an unauthorized third party, without damaging the inlay.

At least one transparent layer of the security inlay can be manufactured from polycarbonate or polyethylene terephthalate. In a variant, the security inlay can be manufactured wholly from polycarbonate or polyethylene terephthalate.

Advantages of manufacturing the security inlay from polycarbonate or polyethylene terephthalate arise, for example, from the resistance, the lightness and the flexibility of the materials.

The color coating and/or the first UV color coating and/or the second UV color coating and/or the first background color coating and/or the second background color coating can be formed from solvent-containing, in particular pigment-based, inks. The solvent-containing, in particular pigment-based, inks can be suitable for dissolving and at least partially penetrating a surface of polycarbonate or polyethylene terephthalate during an application process.

An advantage of the use of such solvent-containing inks to form the color coating or the background color coatings is that it increases the counterfeit protection of the security inlays. For example, it is thus difficult for an unauthorized third party to remove the color coating from the first transparent layer, for example for the purpose of replacing the first color coating.

The color coating and/or the first UV color coating and/or the second UV color coating and/or the first background color coating and/or the second background color coating can comprise forensic markers, in particular silicon, silicon dioxide, mica, titanium oxide and/or tin oxide.

An advantage of the use of such forensic markers is the verifiability of the integrity of a security inlay. Although such forensic markers typically cannot be recognized with the naked eye, it can be determined by means of a purposive examination of the security inlay on the basis of the forensic markers whether it is an original document or a counterfeit.

The first transparent layer of the security inlay can have a depression. The color coating and/or the first UV color coating and/or the second UV color coating can be located at least partially in the region of the depression of the first transparent layer. A transparent polymer material can further be located in the depression, so that at least a portion of the color coating and/or of the first UV color coating and/or of the second UV color coating is enclosed by the first layer and the polymer material. The polymer material can in particular be heat- and/or UV-curable.

Alternatively, the depression of the first transparent layer can be filled with the lacquer layer.

In one embodiment, the polymer material and/or the lacquer layer and/or at least one of the transparent layers can comprise an additive which reflects UV light in a first and/or in a second wavelength range, for example the polymer material can comprise color pigments which reflect UV light.

For example, the lacquer layer and/or the transparent cover layer and/or at least one of the transparent layers can comprise nanoscale luminophores which are configured to reflect UV light of a predetermined wavelength. In one example, the nanoscale luminophores which are incorporated in the lacquer layer of the security inlay can reflect UV light of a predetermined wavelength so that, when the security inlay is illuminated with UV light of the predetermined wavelength, a portion of the color coating and/or of the first UV color coating and/or of the second UV color coating is concealed for an observer of the security inlay.

In a further development, the polymer material can comprise forensic markers, in particular silicon, silicon dioxide, mica, titanium oxide and/or tin oxide.

In one embodiment, the depression can be so filled with the polymer material or the lacquer layer that this is flush with the surface of the first transparent layer, so that a planar overall surface without raised and/or depressed portions is obtained.

An advantage of the depression in which the color coating and/or the first UV color coating and/or the second UV color coating are at least partially enclosed by the first layer and a polymer material or a lacquer layer is that it increases the counterfeit protection, since it makes it considerably more difficult for an unauthorized third party to remove or replicate the color coating and/or the first UV coating and/or the second UV coating, for example for the purpose of counterfeiting the security inlay, without damaging the security inlay.

A method for producing a security inlay having optically recognizable characters for an identity document comprises the steps:

providing a first transparent layer, providing a second transparent layer, producing a first portion of the optically recognizable characters by blackened sections in at least one layer by means of a beam of laser light, producing a second portion of the optical characters by applying a color coating to the first layer, producing a third portion of the optical characters by applying to the first layer and/or to the color coating a first UV color coating which reflects at least UV light in a first wavelength range.

The order in which the steps are carried out is not fixed. In particular, in one exemplary embodiment, first the second portion of the optically recognizable characters and then the first portion of the optically recognizable characters can be produced.

In a variant, the method for producing a security inlay having optically recognizable characters for an identity document further comprises at least one of the steps:

producing a depression in the first layer, in particular by pressing and/or embossing and/or milling, filling the depression with a transparent, in particular heat- and/or UV-curable polymer material or with a lacquer layer, producing a fourth portion of the optical characters by applying to the first layer and/or to the color coating and/or to the first UV color coating a second UV color coating which reflects at least UV light in a second wavelength range, providing a cover layer, bonding at least one of the transparent layers with the cover layer and/or applying the first lacquer layer to the first transparent layer.

Bonding of the layers can take place by a laminating process.

For producing the color coating and/or the first UV color coating and/or the second UV color coating there can be used solvent-containing, in particular pigment-based, inks which dissolve and at least partially penetrate a surface of the first layer which in particular is manufactured from polycarbonate or polyethylene terephthalate.

In a variant of the method, the lacquer layer can be applied to the first transparent layer while the color coating and/or the first UV color coating and/or the second UV color coating are not yet completely dried/cured. An advantage thereof is improved adhesion or bonding between the (UV) color coatings and the lacquer layer, so that it becomes more difficult to detach the lacquer layer from the first transparent layer having the color coatings without damaging the security inlay. The security of the inlay can thereby be improved further.

A device for producing a security inlay for an identity document having optically recognizable characters comprises a laser device, a printing device and an optional laminating device. The laser device is configured and arranged to produce blackened sections at least in a first and/or second transparent layer by means of a beam of laser light. The printing device is configured and arranged to apply to the first layer a color coating which in particular is transparent to infrared light. The printing device is further arranged configured to apply at least a first UV color coating to the transparent layer and/or to the color coating. In a further development, the printing device can further be configured to apply a lacquer layer to the first layer. Alternatively, there can be provided a second printing device or a lacquering device which is configured to apply the lacquer layer to the first layer. The optional laminating device is configured to bond the cover layer with the first transparent layer.

An advantage of a printing device which is configured both to apply a color coating to the first transparent layer and to apply at least a first UV color coating to the first transparent layer and/or to the first color coating is increased efficiency of the manufacturing process and thus a reduction in the production costs. If in one embodiment the use of black color components to produce the color coating is dispensed with, for example because the black color portions of a complete image are formed by the blackened sections in at least one of the transparent layers, then the printing device, which is preferably an ink-jet printing device, can in this embodiment be equipped with a UV-color cartridge instead of with a black-color cartridge.

An advantage of the device for producing a security inlay is that a security inlay that in itself is finished, for example in ID 1 format or in ID 3 format, in contrast to printing in sheet format, can be personalized with high counterfeit protection by being printed, lasered and then provided with a cover layer. Alternatively to the cover layer, a lacquer layer can also be applied.

According to a third aspect, the security inlay having optically recognizable characters for an identity document comprises at least a first transparent layer which comprises a depression. On the first transparent layer there is located a color coating which is transparent to infrared light. The color coating is located on the first transparent layer at least partially in the region of the depression. In the depression of the first transparent layer there is additionally located a transparent polymer material which can in particular be a lacquer material. At least a portion of the color coating is enclosed by the first transparent layer and the transparent polymer material which in particular is a lacquer material. The first transparent layer comprises blackened sections. A first portion of the optically recognizable characters is formed by the blackened sections in the first layer. A second portion of the optically recognizable characters is formed by the color coating. The first and the second portions of the optically recognizable characters are arranged and configured to reflect visible light. The first portion of the optically recognizable characters is arranged and configured to reflect infrared light.

An advantage of a depression in which the color coating is at least partially enclosed by the first layer and the polymer material or lacquer material is that it increases the counterfeit protection, since it makes it considerably more difficult for an unauthorized third party to remove or replicate the color coating, for example for the purpose of counterfeiting the security inlay, without damaging the security inlay.

During irradiation with visible light, the security inlay shows first graphical information, which is formed jointly by the first portion of the optically recognizable characters and the second portion of the optically recognizable characters. Under irradiation with infrared light, the security inlay shows second graphical information which is formed by the first portion of the optical characters.

In a first example, a first image can be represented by the color coating on the first transparent layer, so that this image is optically recognizable during irradiation with visible light. At the same time, a second image, which in particular is an image that is different from the first image, can be represented by blackened sections in the first layer. This second image can be concealed by the first image, so that it is not optically recognizable during irradiation with visible light. Conversely, the security inlay can show only the second image during irradiation with infrared light. Instead of the second image, text information, for example, can also be represented by the blackened sections in the first layer.

In a second example, a first image can be represented by the color coating on the first transparent layer and a second image can be represented by blackened sections in the first transparent layer, without the first image concealing the second image. Thus, during irradiation with visible light, the first and the second image are visible, and during irradiation with infrared light, only the second image is visible.

In a third example, a first image can be represented by the color coating on the first transparent layer and a second image can be represented by blackened sections of the first transparent layer, wherein the first and the second image overlap at least partially from the perspective of an observer. For example, the black portions of a complete image can be formed by the blackened sections in the first transparent layer, while the colored portions of the complete image are formed by the color coating, so that during irradiation with visible light, the complete image is visible and during irradiation with infrared light, only a partial image is visible.

In a fourth example, a first portion of text or an image can be represented by the color coating, in particular by a black or cmy-black color coating which is transparent to infrared light, while a second portion of the text or image is represented by the blackened sections in the first transparent layer, so that during irradiation of the security inlay with visible light, all of the text or the complete image is visible, and during irradiation of the security inlay with infrared light, only a portion of the text or image is visible.

In a fifth example, text which contains, for example, information about the owner of the security inlay can be represented by omissions in the blackened sections in at least one of the transparent layers. In other words, at least one of the transparent layers has blackened sections which have omissions in particular in the form of letters or other characters, so that during irradiation of the security inlay with infrared light, the letters are recognizable because the blackened sections reflect infrared light but the omissions in the form of the letters or other characters do not reflect infrared light. In other words, the blackened sections show a negative image during irradiation with infrared light. The omissions and/or the blackened sections surrounding them can be so concealed from the perspective of an observer by a color coating, for example a cmy-black color coating which is transparent to infrared light, that they are visible only under infrared light.

An advantage of such a security inlay is that the counterfeit protection is increased and at the same time it is possible to verify that the security inlay is genuine by irradiating it with infrared light. In particular because black-colored portions of the optical characters can be formed both by blackened sections in at least one transparent layer and by black, in particular cmy-black, portions of the color coating, it is considerably more difficult for unauthorized third parties to produce a copy of the security inlay that is not recognizable as a counterfeit, in particular under infrared light.

The color coating can comprise color components from the starting colors cyan, magenta and yellow.

The color coating can be applied to the first transparent layer by means of ink-jet printing.

An advantage of the use of the color components of cyan, magenta and yellow is that, in a variant, it is possible at least partially to dispense with the use of black color components for producing the color coating without thereby limiting the available color spectrum. The black portions of a complete image that are required in printing processes known as prior art (cyan-magenta-yellow-black printing process, CMYK printing process, according to ISO 2846) to produce a true-color complete image can be formed by the blackened sections in at least one of the layers. It is thus possible to dispense at least partially with the use of black color components in the color coating.

Furthermore, by combining the color components of cyan, magenta and yellow it is possible to form a cmy-black color coating which is transparent in particular to infrared light.

The first transparent layer is to be capable of being blackened at least partially by the action of at least one beam of laser light. To that end, the first transparent layer can comprise additives, in particular carbon-based additives. By the action of a beam of laser light it is thus possible purposively to produce blackened sections, in particular charred sections, in a desired intensity.

The blackened sections can have different reflection properties for infrared light than the color coating and thus contribute further to the counterfeit protection and to the verifiability of the integrity of the security inlay. The use of laser beams permits precise and time-efficient production of the blackened sections.

In a variant, the security inlay can comprise a first UV color coating which is located on the first layer and/or on the color coating. The first UV color coating reflects at least UV light in a first wavelength range. A third portion of the optically recognizable characters can be formed by the first UV color coating.

In a further variant, the security inlay can further comprise a second UV color coating located on the first layer and/or on the color coating and/or on the first UV color coating. The second UV color coating reflects at least UV light in a second wavelength range. A fourth portion of the optically recognizable characters can be formed by the second UV color coating.

The third and/or the fourth portion of the optically recognizable characters can show the same graphical information as the first and/or the second portion of the optically recognizable characters and/or different graphical information from the first and/or second portion of the optically recognizable characters. For example, a facial image of an owner of the security inlay can be shown.

The first UV color coating and/or the second UV color coating can be transparent to visible light and/or infrared light.

In a variant, the first UV color coating and/or the second UV color coating can be multicolored UV color coatings. In particular, the UV color coatings can comprise color components of red, green, blue and white (RGBW) or of cyan, magenta, yellow and/or black (CMYK), which each reflect UV light. The use of further color components for the first and/or the second UV color coating is possible in a further development.

The first UV color coating and/or the second UV color coating can be arranged and configured to show to an observer of the security inlay during irradiation of the security inlay with UV light multicolored graphical information, for example a facial image of the cardholder, which is not visible to the observer in particular during irradiation of the security inlay with only visible light.

In a variant, the first and/or the second UV color coating can be bifluorescent. In particular, the first UV color coating can impart to the observer of the security inlay a first color impression during irradiation of the security inlay with UV light of a first wavelength and can impart a second color impression during irradiation of the security inlay with UV light of a third wavelength. Furthermore, the second UV color coating can impart to the observer of the security inlay a third color impression during irradiation of the security inlay with UV light of a second wavelength and can impart a fourth color impression during irradiation of the security inlay with UV light of a fourth wavelength. The first, second, third and fourth color impressions can be different from one another or at least partially identical.

For example, the first UV color coating can impart to the observer of the security inlay during irradiation of the security inlay with UV light of a first wavelength of preferably 365 nm a color impression of the color components red, green, blue and white, and can impart a color impression of the color components green and red during irradiation of the security inlay with UV light of a third wavelength of preferably 254 nm.

In another example, the second UV color coating can impart to the observer of the security inlay during irradiation of the security inlay with UV light of a second wavelength of preferably 365 nm a blue color impression, and can impart a red color impression during irradiation of the security inlay with UV light of a fourth wavelength of preferably 313 nm.

An advantage of the first UV color coating and/or of the second UV color coating is that further security features which become visible under irradiation of the security inlay with UV light can be added to the security inlay by producing a third and/or fourth portion of the optical characters. If both a first UV color coating and a second UV color coating which reflect UV light in different wavelength ranges are used, this allows the counterfeit protection of the security inlay to be increased further, in particular since replication of the security inlay is made even more difficult.

In one embodiment, the first UV color coating and/or the second UV color coating can be located at least partially in the region of the depression of the first transparent layer. The polymer material located in the depression, which in particular is a lacquer material, can, together with the first transparent layer, enclose at least a portion of the first UV color coating and/or of the second UV color coating.

The polymer material, which in particular is a lacquer material, can in particular be heat- and/or UV-curable.

In one embodiment, the depression can be so filled with the polymer material or lacquer material that this is flush with the surface of the first transparent layer, so that a planar overall surface without raised and/or depressed portions is obtained.

In one embodiment, the polymer material or lacquer material can comprise an additive which reflects UV light in a first and/or in a second wavelength range, for example the polymer material can comprise color pigments which reflect UV light.

For example, the polymer material or lacquer material and/or the transparent cover layer and/or at least one of the transparent layers can comprise nanoscale luminophores which are configured to reflect UV light of a predetermined wavelength. In one example, the nanoscale luminophores which are incorporated into the polymer material of the security inlay can reflect UV light of a predetermined wavelength so that, when the security inlay is illuminated with UV light of the predetermined wavelength, a portion of the color coating and/or of the first UV color coating and/or of the second UV color coating is concealed for an observer of the security inlay.

In a further development, the polymer material or lacquer material can comprise forensic markers, in particular silicon, silicon dioxide, mica, titanium oxide and/or tin oxide.

In one embodiment, the security inlay can further comprise a transparent cover layer of polycarbonate, polyethylene terephthalate or polyethylene terephthalate glycol.

An advantage of the cover layer is that it protects the security inlay from negative environmental influences such as, for example, the penetration of moisture, or it protects against mechanical damage such as, for example, scratching of the security inlay.

Alternatively or in addition to the transparent cover layer, the security inlay can comprise a lacquer layer which is applied to the first transparent layer and/or to the color coating and/or to the first UV color coating and/or to the second UV color coating. For example, the lacquer layer can completely cover a surface of the first transparent layer and a color coating located thereon or, in another example, it can cover only a color coating located on the first transparent layer, and/or the first UV color coating and/or the second UV color coating. In a further development, the lacquer layer can cover the color coating located on the first transparent layer, and/or the first UV color coating and/or the second UV color coating and a portion of the first transparent layer. For example, the area covered by the lacquer layer can be from 5 to 20 percent larger than the area of the color coating located on the first transparent layer and/or of the first UV color coating and/or of the second UV color coating.

The color coating and/or the first UV color coating and/or the second UV color coating can be completely enclosed/encircled by the lacquer layer and the first transparent layer, so that the lacquer layer and the first transparent layer in conjunction surround the color coating and/or the first UV color coating and/or the second UV color coating completely.

The lacquer layer can be transparent to visible light and/or infrared light and/or UV light. The lacquer layer can comprise a manufacturing material which is the same as a manufacturing material of the first transparent layer. At least a portion of the lacquer layer can comprise a manufacturing material of methacrylate, polyester acrylate or urethane acrylate. Furthermore, a manufacturing material of the lacquer layer can in particular be a heat- and/or UV-curable manufacturing material.

The lacquer layer can have a thickness of less than 100 µm, for example a thickness of from 12 µm to 80 µm. In particular, the lacquer layer can have a thickness of from 30 µm to 80 µm. Furthermore, the lacquer layer can be capable of being applied to the first transparent layer by means of an ink-jet printer. The temperature resistance of the lacquer layer can be greater than the temperature resistance of one of the transparent layers. In particular, the temperature resistance of the lacquer layer can be greater than the temperature resistance of the first transparent layer.

The lacquer layer can be applied to the first transparent layer optionally in the form of a rectangle, a star or with the contour of a national symbol or emblem. In a variant, the lacquer layer can be applied to the first transparent layer with the contour of a facial image congruently or enlarged relative to the facial image.

An advantage of the lacquer layer is that it cannot be removed from the first transparent layer, or can be removed only with difficulty, and thus improves the counterfeit protection of the security inlay. In addition, the lacquer layer can protect the first transparent layer from scratching and/or wear.

The security inlay can further comprise a second transparent layer, which in particular is to be blackened by laser light, a third transparent layer, which in particular is to be blackened by laser light, and/or a fourth transparent layer, which in particular is to be blackened by laser light.

An advantage of further transparent layers, which in particular are to be blackened by laser light, is that they further increase the counterfeit protection. A totality of optically recognizable characters perceived from the perspective of an observer can thus be dislocated to a plurality of transparent layers as well as a color coating and/or a plurality of UV color coatings.

At least one of the transparent layers can have an enlarged base area compared to another transparent layer, wherein base area is to be understood as meaning the dimensions of the security inlay, or individual transparent layers, from the point of view of an observer of the security inlay. The enlarged base area of the at least one transparent layer can advantageously serve for bonding the security inlay with a booklet, in particular a passport. The portion of the at least one transparent layer that is enlarged compared to another transparent layer can thereby be used for fixing the security inlay in the booklet.

A first background color coating can be located on the second layer. A second background color coating can be located on the fourth layer.

The first and/or the second background color coating can be produced by an offset printing process.

An advantage of the use of background color coatings is a contribution to the optically perceivable total information of the security inlay that can be manufactured efficiently. Both the first and the second background color coatings can comprise security features which further increase the counterfeit protection of the security inlay.

The security inlay can further comprise an insert which has at least a first, in particular opaque and/or optically active, insert layer. The insert can be located, for example, between the second and the third transparent layers.

In a variant, the insert can be located in a recess of the second and/or third transparent layer.

In one embodiment, the insert can comprise a second, in particular opaque and/or optically active, insert layer. An arrangement of electronic components, in particular antenna modules and/or RFID chips, can be located between the first and second insert layers. Embodiments with further insert layers are possible.

An advantage of the use of an antenna module and/or RFID chip is that it further increases the counterfeit protection and the verifiability of the integrity of the security inlay by means of electronic reading devices for RFID chips, which are known as prior art.

At least one of the layers can comprise a hologram element which is visible to an observer of the security inlay and has a visual-holographic effect. The visual-holographic effect can be optically recognizable both under visible light and under invisible light, in particular under infrared or ultraviolet light.

In a variant, the hologram element can be transparent to UV light.

The hologram element, at least from the perspective of an observer, can at least partially overlap with a portion of the optically recognizable characters.

In a further development, the hologram element can also be arranged between the transparent layers or between a transparent layer and the insert. In particular, the hologram element can be arranged between the first transparent layer and the second transparent layer or between the second transparent layer and the insert.

An advantage of the use of a hologram element is that it further increases the counterfeit protection and the verifiability of the integrity of the security inlay.

The transparent layers and/or the insert and/or the cover layer can be bonded together by lamination.

An advantage of laminating the at least two transparent layers is that it is difficult to separate the layers from one another without damaging the inlay, for example in order to produce a counterfeit of the security inlay by an unauthorized third party.

At least one transparent layer of the security inlay can be manufactured from polycarbonate or polyethylene terephthalate. In a variant, the security inlay can be manufactured wholly from polycarbonate or polyethylene terephthalate or polyethylene terephthalate glycol.

Advantages of manufacturing the security inlay from polycarbonate or polyethylene terephthalate arise, for example, from the resistance, the lightness and the flexibility of the materials.

The color coating and/or the first UV color coating and/or the second UV color coating and/or the first background color coating and/or the second background color coating can be formed from solvent-containing, in particular pigment-based, inks. The solvent-containing, in particular pigment-based, inks can be suitable for dissolving and at least partially penetrating a surface of polycarbonate or polyethylene terephthalate during an application process.

An advantage of the use of such solvent-containing inks to form the color coating or the background color coatings is that it increases the counterfeit protection of the security inlays. For example, it is thus difficult for an unauthorized third party to remove the color coating from the first transparent layer, for example for the purpose of replacing the first color coating.

The color coating and/or the first UV color coating and/or the second UV color coating and/or the first background color coating and/or the second background color coating can comprise forensic markers, in particular silicon, silicon dioxide, mica, titanium oxide and/or tin oxide.

A method for producing a security inlay having optically recognizable characters for an identity document comprises the steps:
- providing a first transparent layer,
- producing a first portion of the optically recognizable characters by blackened sections of the first transparent layer by means of a beam of laser light,
- producing a depression in the first layer,
- producing a second portion of the optically recognizable characters by applying a color coating to the first layer, wherein at least a portion of the color coating is applied in the region of the depression of the first layer,
- filling the depression with transparent polymer material, in particular with a lacquer material.

The order in which the steps are carried out is not fixed. In particular, in one exemplary embodiment, first the second portion of the optically recognizable characters and then the first portion of the optically recognizable characters can be produced.

The depression in the first transparent layer can be produced by pressing and/or embossing and/or milling.

In a variant, the method for producing a security inlay having optically recognizable characters for an identity document further comprises at least one of the steps:
- producing a third portion of the optical characters by applying to the first layer and/or to the color coating a first UV color coating which reflects at least UV light in a first wavelength range,
- producing a fourth portion of the optical characters by applying to the first layer and/or to the color coating and/or to the first UV color coating a second UV color coating which reflects at least UV light in a second wavelength range,
- producing optically recognizable characters by blackened sections in the second transparent layer by means of a beam of laser light,
- providing a cover layer,
- bonding the cover layer with the first transparent layer and/or applying the lacquer layer to the first transparent layer.

Bonding of the layers can take place by a laminating process.

For producing the color coating and/or the first UV color coating and/or the second UV color coating, there can be used solvent-containing, in particular pigment-based, inks which dissolve and at least partially penetrate a surface of the first layer which in particular is manufactured from polycarbonate or polyethylene terephthalate.

In a variant of the method, the lacquer layer can be applied to the first transparent layer while the color coating and/or the first UV color coating and/or the second UV color coating are not yet completely dried/cured. An advantage thereof is improved adhesion or bonding between the (UV) color coatings and the lacquer layer, so that it is more difficult to detach the lacquer layer from the first transparent layer having the color coatings without damaging the security inlay. The security of the inlay can thereby be improved further.

A device for producing a security inlay for an identity document having optically recognizable characters comprises an embossing device, a laser device, a printing device and/or an infilling device. The embossing device is configured and arranged to emboss a depression into the first transparent layer. The laser device is configured and arranged to produce blackened sections at least in the first transparent layer by means of a beam of laser light. The printing device is configured and arranged to apply to the first layer a color coating and/or at least one UV color coating which in particular is transparent to infrared light. In a further development, the printing device can further be configured to apply a lacquer layer to the first layer. Alternatively, there can be provided a second printing device or a lacquering device which is configured to apply the lacquer layer to the first layer. The infilling device is arranged and configured to infill the depression in the first transparent layer with transparent polymer material or with lacquer material. In a further development, the printing device can also be configured to infill the depression in the first transparent layer with transparent polymer material or with lacquer material, so that a separate infilling device is not necessary.

In a further development, the device for producing the security inlay can further comprise a laminating device which is arranged and configured to bond the first transparent layer with a further layer and/or with a cover layer by lamination.

An advantage of the device for producing a security inlay is that a security inlay that in itself is finished, for example in ID 1 format or in ID 3 format, in contrast to printing in sheet format, can be personalized with high counterfeit protection by being printed, lasered and then provided with a cover layer.

It is clear to the person skilled in the art that the aspects and features described hereinbefore can be combined as desired.

BRIEF DESCRIPTION OF THE DRAWINGS

Further features, properties, advantages and possible modifications will become apparent for a person skilled in the art from the following description, in which reference is made to the accompanying drawings. In the drawings, the figures each show schematically and by way of example a security inlay for an identity document having optically recognizable characters, or a portion of such a security inlay. All the features described and/or depicted thereby show the subject-matter disclosed herein on their own or in any desired combination. The dimensions and proportions of the components shown in the figures are not to scale.

FIG. 1A-1B show schematically and by way of example the layer structure of a security inlay for an identity document in an exploded diagram.

FIG. 2A-2D show schematic examples of the arrangement of a color coating on a first transparent layer and of blackened sections in one or more transparent layer(s).

FIG. 3A-3C show exemplary embodiments of a security inlay for an identity document which comprise a first portion of optically recognizable characters and a second portion of optically recognizable characters.

FIG. 4A-4F show exemplary embodiments of a security inlay for an identity document which comprise a depression in the first transparent layer.

FIG. 5A-5G show exemplary embodiments of a security inlay for an identity document which comprise at least one UV color coating.

DETAILED DESCRIPTION OF THE EMBODIMENTS

Figure 1B:
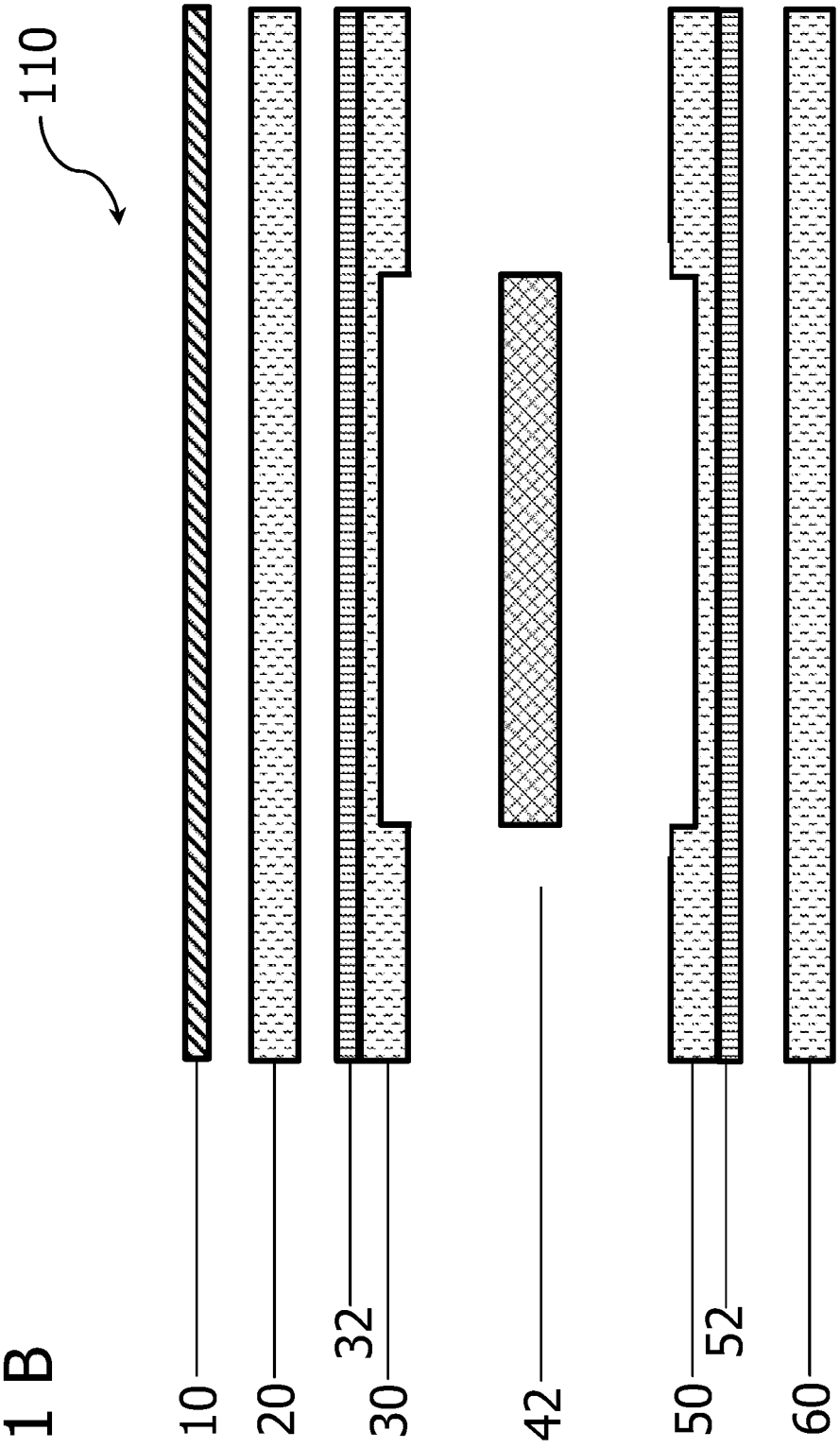

FIG. 1A shows by way of example a layer structure for a security inlay 100 for an identity document. The layer structure can comprise, for example, as shown in FIG. 1A, a cover layer 10, a first transparent layer 20, a second transparent layer 30, an insert 40, a third transparent layer 50 and a fourth transparent layer 60. The insert 40 is arranged between the second transparent layer 30 and the third transparent layer 50, so that it completely separates the second and third transparent layers from one another and in each case lies completely against the surfaces of the second transparent layer 30 and the third transparent layer 50. In the example shown in FIG. 1A, the insert 40 is arranged parallel to the transparent layers 20, 30, 50, 60.

In alternative embodiments, the security inlay can also comprise a printed lacquer layer (not shown) in addition or alternatively to the cover layer 10 shown in FIG. 1A. In embodiments which comprise a printed lacquer layer instead of a cover layer 10, the lacquer layer is arranged analogously to the cover layer 10 and performs the protective function thereof for the surface of the security inlay.

A prefabricated first background color coating 32 and a prefabricated second background color coating 52 are located, as shown in FIG. 1A, on the second transparent layer 30 and the third transparent layer 50. The first background color coating 32 is located on the surface of the second transparent layer 30 that faces towards the cover layer 10. The second background color coating 52 is located on the side of the third transparent layer 50 that faces away from the cover layer 10.

The first background color coating 32 and the second background color coating 52 are printed onto the second and onto the third transparent layer 30, 50, respectively, by offset printing. The background color coating 32 is thus arranged between the color coating 22 and the blackened sections 34.

FIG. 1B shows an alternative exemplary layer structure to FIG. 1A for a security inlay 110 having optically recognizable characters for an identity document. In the embodiment shown in FIG. 1B, the insert 42 is configured and arranged to be located in a depression of the second transparent layer 30 and a depression of the third transparent layer 50. In contrast to the example shown in FIG. 1A, the insert 42 has in a cross-section a smaller extent than the transparent layers enclosing the insert.

The insert 40, 42 can comprise a single or a plurality of optically active, in particular transparent, insert layers. If the insert 40, 42 in a variant further comprises an antenna module and/or an RFID chip (not shown), the insert 40, 42 must comprise at least two optically active insert layers.

FIG. 2A shows by way of example a layer structure for a security inlay 200 having a color coating 22. The color coating 22 is located on the surface of the first transparent layer 20 that faces towards the cover layer 10. (The color coating 22 is shown with a significant vertical exaggeration in the schematic drawing, in order to be visible in cross-section.) The first transparent layer 20 and the color coating 22 are protected by the cover layer 10 from negative environmental influences, for example the penetration of moisture or mechanical damage such as scratches.

The color coating 22 is formed by a color imprint of the base colors cyan, magenta and yellow. By combining the base colors, a so-called cmy-black can also be formed, which arises by superimposing the base colors. In a variant, the color coating 22 can also comprise black color components which are transparent to infrared light.

For an observer viewing the security inlay 200 composed of a plurality of layers from the direction of the cover layer 10, the color coating 22 is visible against the background color coatings 32 and 52.

FIG. 2B shows a security inlay 210 for an identity document having optically recognizable characters. In addition to the color coating 22, the first transparent layer 20 shown has the blackened sections 24.

The first transparent layer 20, the second transparent layer 30, the third transparent layer 50 and the fourth transparent layer 60 are manufactured from a polycarbonate material and comprise carbon-containing additives which form the blackened sections under the action in particular of laser light. The blackened sections can be formed in a desired intensity by regulating the intensity and duration of action of the laser light.

The color coating 22, which is formed of the base colors cyan, magenta and yellow, and the blackened sections 24 complement one another, at least from the perspective of an observer, to form a complete image. The black portions of the complete image are thereby formed by the blackened sections 24, so that the color coating 22 does not have to comprise black components.

In another embodiment, the color coating 22, at least from the perspective of the observer, can completely conceal the blackened sections 24 of the first transparent layer 20, so that only the color coating 22 is visible to the observer. For example, a blackened section 24 can be completely concealed by a cmy-black color coating 22.

FIG. 2C shows a security inlay 220 for an identity document having optically recognizable characters. In addition to the color coating 22, the second transparent layer 30 shown has the blackened sections 34.

The blackened sections 34 shown, at least from the perspective of the observer, are optically distinguishable from the blackened sections 24 shown in FIG. 2B only with difficulty or not at all. The manufacture and the properties of the blackened sections 34 correspond to the blackened sections 24 as described in connection with FIG. 2B. The same applies analogously to blackened sections in the third transparent layer 50 and/or the fourth transparent layer 60. (Not shown)

Figure 2D:
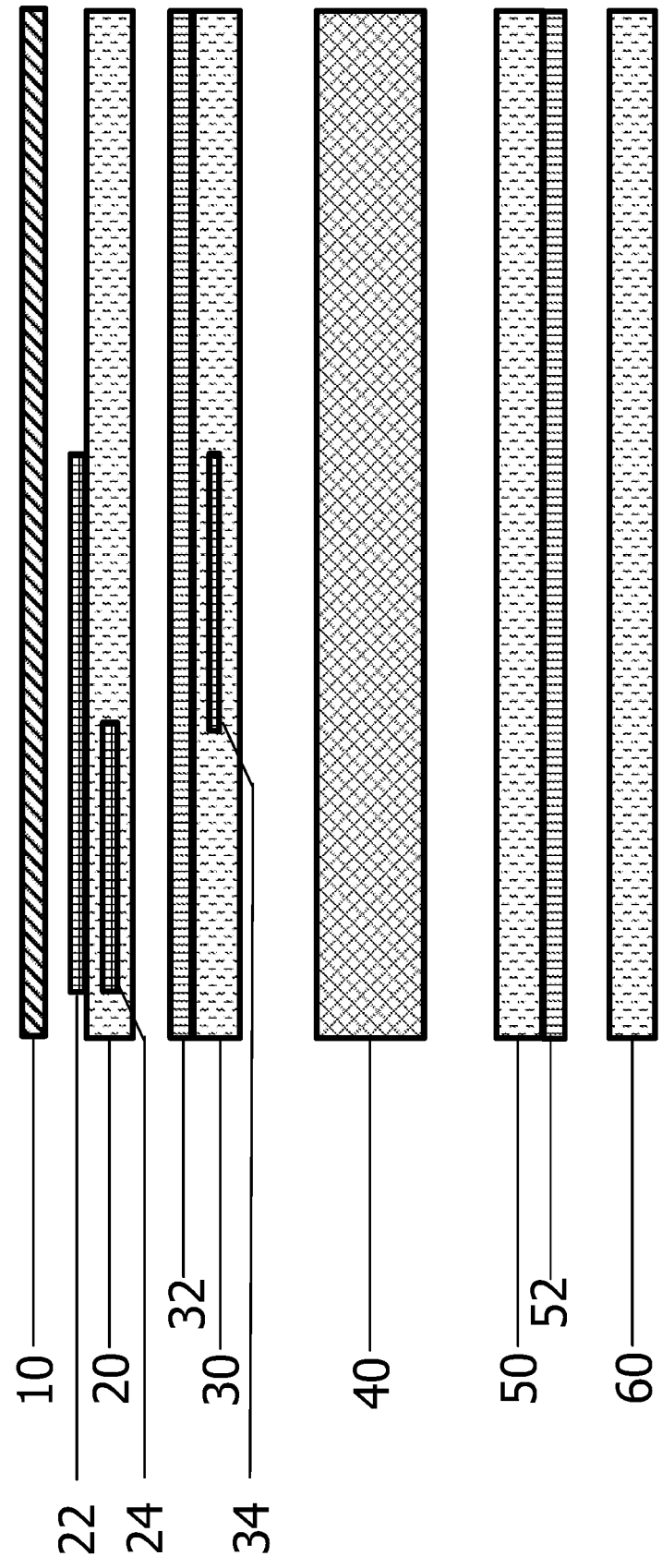

FIG. 2D shows a security inlay 230 for an identity document having optically recognizable characters, which comprises both blackened sections 24 in the first transparent layer 20 and blackened sections 34 in the second transparent layer 30. The blackened sections are located in different regions beneath the color coating 22.

In other embodiments (not shown), the blackened sections can overlap and/or complement one another from the perspective of the observer.

Both the blackened sections 24 and the blackened sections 34 can contribute to the black portion of a complete image which an observer of the security inlay perceives optically, and can also be partially or completely concealed by the color coating 22. The partial or complete optical concealing of the blackened sections 24, 34 by the color coating 22 from the perspective of the observer of the security inlay can be effected in particular by a cmy-black portion of the color coating 22.

An advantage of a security inlay 230 as shown in 2D is that it is difficult for an observer to determine in which transparent layer a blackened section is located, without damaging the security inlay 230. Counterfeiting of the security inlay is thus made more difficult.

FIG. 3A shows a security inlay 300 having optically recognizable characters for an identity document. The security inlay 300 shown in FIG. 3A comprises a first transparent layer 20 and a second transparent layer 30, each of which is manufactured from polycarbonate with carbon-containing additives. On the first transparent layer 20 there is located a lacquer layer 302 and a color coating 22.

The first transparent layer 20 further has a plurality of blackened sections 24 which have purposively been formed by the action of a beam of laser light on the carbon-containing additives contained in the first transparent layer 20.

In other embodiments (not shown), those layers which do not comprise blackened sections can, for example, also be manufactured from polycarbonate without carbon-containing additives.

The color coating 22 is located on the surface of the first transparent layer 20 and is formed by a color imprint of the base colors cyan, magenta and yellow. (The color coating 22 is shown with a significant vertical exaggeration in the schematic drawing, in order to be visible in cross-section.)

The color coating 22 shown in FIG. 3A does not contain blackened sections, is transparent to infrared light and reflects visible light.

The color coating 22 and the blackened sections 24 complement one another, at least from the perspective of an observer, to form a complete image. The black portions of the complete image are thereby formed by the blackened sections 24. The blackened sections 24 reflect both visible light and infrared light.

The blackened sections 24 thus form a first portion of the optically recognizable characters of the security inlay 300, and the color coating 22 forms a second portion of the optically recognizable characters of the security inlay 300.

During irradiation of the security inlay 300 with visible light, the complete image formed jointly by the first portion of the optically recognizable characters and the second portion of the optically recognizable characters is visible to an observer. During irradiation of the security inlay 300 with only infrared light, only the first portion of the optically recognizable characters is visible to an observer.

FIG. 3B shows a further development of the security inlay 310 having optically recognizable characters for an identity document. The further development shown in FIG. 3B comprises all the described features of FIG. 3A. In addition, in FIG. 3B the second transparent layer 30 also comprises at least one blackened section 34. The blackened section 34, analogously to the blackened sections 24, is formed by irradiation of the second transparent layer 30 with laser light.

Analogously to the blackened sections 24, the blackened section 34 also complements the color coating 22, at least from the perspective of the observer, to form a complete image. The black portions of the complete image are formed in the variant shown in FIG. 1B both by the blackened sections 24 and by the blackened section 34. The blackened section 34, together with the blackened sections 24, forms the first portion of the optically recognizable characters which reflects both visible and infrared light.

FIG. 3C shows a further development of a security inlay 320 having optically recognizable characters for an identity document. The further development shown in FIG. 3C comprises all the described features of FIGS. 3A and 3B.

As compared with FIGS. 3A and 3B, FIG. 3C further comprises a cover layer 10, an insert 40, a third transparent layer 50, a fourth transparent layer 60, a first background color coating 32 and a second background color coating 52.

The first background color coating 32 is located on the surface of the second transparent layer 30 that faces towards the cover layer 10. The second background color coating 52 is located on the surface of the third transparent layer 50 that faces away from the cover layer 10.

In other embodiments (not shown), a number of further background color coatings can be located on the transparent layers and/or the insert.

The cover layer 10 shown in FIG. 3C is transparent to visible light and/or infrared light, while the insert 40 shown is opaque to visible and infrared light.

In a further development (not shown), one of the transparent layers 20, 30, 50, 60 and/or the insert 40 can comprise a hologram element which is visible to an observer of the security inlay 320 and has a visual-holographic effect. The visual-holographic effect can be optically recognizable both under visible light and under invisible light, in particular under infrared and/or ultraviolet light.

In a variant, the hologram element can be transparent to UV light.

The hologram element, at least from the perspective of an observer, can at least partially overlap with a portion of the optically recognizable characters.

In a further development, the hologram element can also be arranged between the transparent layers 20, 30, 50, 60 and/or the insert 40. In particular, the hologram element can be arranged between the first transparent layer 20 and the second transparent layer 30 or between the second transparent layer 30 and the insert 40.

The insert 40 is arranged between the second transparent layer 30 and the third transparent layer 50, so that it completely separates the second and third transparent layers from one another and in each case lies completely against the surfaces of the second transparent layer 30 and the third transparent layer 50. In the example shown in FIG. 3C, the insert 40 is arranged parallel to the transparent layers 20, 30, 50, 60.

In another further development (not shown), the insert 40 can have at least two optically active insert layers which enclose an RFID chip and/or an antenna element.

FIGS. 4A and 4B show by way of example a layer structure for a security inlay 400, 410 having optically recognizable characters for an identity document having a depression.

The security inlays 400, 410 shown in FIGS. 4A and 4B each comprise a first transparent layer 20 and a second transparent layer 30, which are each manufactured from polycarbonate with carbon-containing additives, where a lacquer layer 402 of the type described above is shown on the layer 20.

In other embodiments (not shown), those layers which do not comprise blackened sections can also be manufactured, for example, from polycarbonate without carbon-containing additives. The first transparent layer 20 shown in FIG. 4A has a depression. The depression can have a depth, for example, of from 40 to 80 μm. The second transparent layer 30 has the blackened sections 34, which is located at least partially beneath the depression from the perspective of an observer of the security inlay 400. The blackened sections 34 are formed by the action of a beam of laser light on the carbon-containing additives contained in the second transparent layer 30.

FIG. 4B shows, in addition to the features shown in FIG. 4A, the color coating 22, which is located in the depression of the first transparent layer 20. The color coating 22 is formed by a color imprint of the base colors cyan, magenta and yellow. The color coating does not protrude from the depression. (The color coating 22 is shown with a significant vertical exaggeration in the schematic drawing, in order to be visible in cross-section.)

In one exemplary embodiment (not shown), the contour of the depression can be substantially adapted to the graphical information which is formed jointly by the first portion of the optically recognizable characters and the second portion of the optically recognizable characters.

The color coating 22 shown in FIGS. 4A and 4B does not contain black color components, is transparent to infrared light and reflects visible light.

The color coating 22, which is formed of the base colors cyan, magenta and yellow, and the blackened sections 34 complement one another, at least from the perspective of an observer, to form a complete image. The black portions of the complete image are thereby formed by the blackened sections 34. The blackened sections 34 reflect both visible light and infrared light.

The blackened sections 34 thus form a first portion of the optically recognizable characters of the security inlay 400, 410, and the color coating 22 forms a second portion of the optically recognizable characters of the security inlay 400, 410.

During irradiation of the security inlay 400, 410 with visible light, the complete image formed jointly by the first portion of the optically recognizable characters and the second portion of the optically recognizable characters is visible to an observer. During irradiation of the security inlay 400, 410 with only infrared light, only the first portion of the optically recognizable characters is visible to an observer.

FIG. 4C shows by way of example a layer structure for a security inlay 420 having optically recognizable characters for an identity document having a depression which is filled with a polymer material and including a lacquer layer 422 of the type described above. The polymer material can in particular be a lacquer material.

FIG. 4C contains all the features of FIGS. 4A and 4B. FIG. 4C further shows a polymer material 26, which is located in the depression of the first transparent layer 20. The polymer material 26 shown is transparent to visible and invisible, in particular ultraviolet or infrared, light and is heat-curable.

In one embodiment (not shown), the polymer material can comprise an additive which reflects UV light in a first and/or in a second wavelength range, in particular color pigments which reflect UV light.

In a further development (not shown), the polymer material can comprise forensic markers, in particular silicon, silicon dioxide, mica, titanium oxide and/or tin oxide.

The polymer material 26 located in the depression of the first transparent layer 20 is flush with the surface of the first transparent layer 20, so that the entire surface of the first transparent layer 20 and of the polymer material 26 is a planar surface without raised or depressed portions.

FIG. 4D shows by way of example a layer structure for a security inlay 430 having optically recognizable characters for an identity document having a depression which is filled with a polymer material and including a lacquer layer 432 of the type described above.

FIG. 4D contains all the features of FIG. 4C. In addition, FIG. 4D shows the blackened sections 24 in the first layer 20. The blackened sections 24 in the first transparent layer 20 and the blackened sections 34 in the second transparent layer 30 are located, from the perspective of the observer, in different regions beneath the color coating 22.

In other embodiments (not shown), the blackened sections can overlap and/or complement one another from the perspective of the observer.

The blackened sections 24, analogously to the blackened sections 34, are formed by irradiation of the first transparent layer 20 with laser light.

Both the blackened sections 24 and the blackened sections 34 can contribute to the black portion of a complete image which an observer of the security inlay perceives optically, and can also be partially or completely concealed by the color coating 22. The partial or complete optical concealing of the blackened sections 24, 34 by the color coating 22 from the perspective of the observer of the security inlay can in particular be effected by a cmy-black portion of the color coating 22.

FIG. 4E shows a further development of a security inlay 440 having optically recognizable characters for an identity document. The further development shown in FIG. 4E comprises all the described features of FIG. 4D.

FIG. 4E, compared to FIG. 4D, further comprises a cover layer 10, an insert 40, a third transparent layer 50, a fourth transparent layer 60, a first background color coating 32 and a second background color coating 52.

In particular in exemplary embodiments of the security inlay in which the color coating is enclosed completely by the polymer material, which in particular can be a lacquer material, and the first transparent layer, a transparent cover layer can be dispensed with. In these exemplary embodiments, the first transparent layer can represent the outermost layer of the security inlay.

The first background color coating 32 is located on the surface of the second transparent layer 30 that faces towards the cover layer 10. Furthermore, the first background color coating 32 is arranged between the color coating 22 and the blackened section 34. The second background color coating 52 is located on the surface of the third transparent layer 50 that faces away from the cover layer 10.

In other embodiments (not shown), a number of further background color coatings can be located on the transparent layers and or the insert.

In embodiments in which the security inlay comprises a printed lacquer layer as an alternative or in addition to the cover layer 10, the depression can be filled with the lacquer material from which the lacquer layer is at the same time formed. In other words, the lacquer layer and the material which fills the depression can be integrally formed in these embodiments and in particular introduced/applied by a printing process into the depression or to the first transparent layer (not shown).

In a further development, the polymer material or lacquer material can comprise nanoscale luminophores which reflect UV light of a predetermined wavelength. If the security inlay is illuminated with UV light of the predetermined wavelength, the UV light reflected by the polymer material or lacquer material (or by the luminophores contained therein) conceals for an observer the color coating located therebeneath or the blackened sections located therebeneath/the optical characters located therebeneath.

The cover layer 10 shown in FIG. 4E is transparent to visible light and infrared light, while the insert 40 shown is opaque to visible light and infrared light.

The insert 40 is arranged between the second transparent layer 30 and the third transparent layer 50, so that it completely separates the second and third transparent layers from one another and in each case lies completely against the surfaces of the second transparent layer 30 and the third transparent layer 50. In the embodiment shown in FIG. 4E, the insert 40 is arranged parallel to the transparent layers 20, 30, 50, 60.

In a further development (not shown), one of the transparent layers 20, 30, 50, 60 and/or the insert 40 can comprise a hologram element which is visible to an observer of the security inlay 440 and has a visual-holographic effect. The visual-holographic effect can be optically recognizable both under visible light and under invisible light, in particular under infrared and/or ultraviolet light.

The hologram element can at least partially overlap with a portion of the optically recognizable characters, at least from the perspective of an observer.

In other further developments (not shown), the hologram element can also be arranged between the transparent layers and/or the insert. In particular, the hologram element can be arranged between the first transparent layer and the second transparent layer or between the second transparent layer and the insert.

In another further development (not shown), the insert 40 can have at least two opaque insert layers which enclose an RFID chip and/or an antenna element.

Figure 4F:
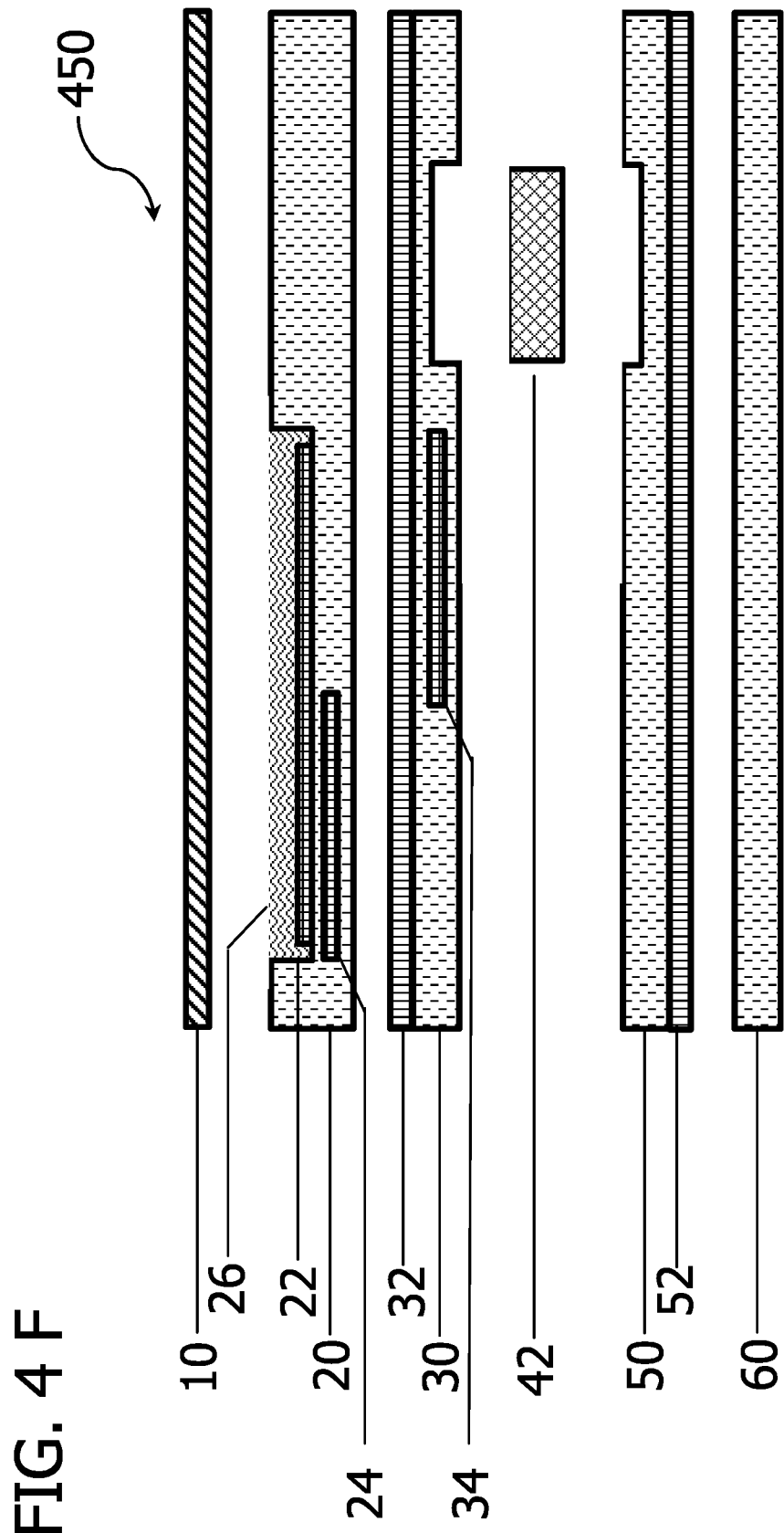

FIG. 4F shows an alternative further development of the security inlay 450 having optically recognizable characters for an identity document. The further development shown in FIG. 4F comprises all the described features of FIG. 4E, apart from the insert 40. The insert 42 shown is configured and arranged to be located in a depression of the second transparent layer 30 and a depression of the third transparent layer 50. In contrast to the example shown in FIG. 4E, the insert 42 has in a cross-section a smaller extent than the transparent layers 30, 50 enclosing the insert.

FIG. 5A shows a security inlay 500 having optically recognizable characters for an identity document having a first UV color coating 28.

The security inlay 500 shown in FIG. 5A comprises a first transparent layer 20 and a second transparent layer 30 which are each manufactured from polycarbonate with carbon-containing additives. On the first transparent layer 20 there is located a color coating 22.

In other embodiments (not shown), those layers which do not have blackened sections can, for example, also be manufactured from polycarbonate without carbon-containing additives.

The first transparent layer 20 further has a plurality of blackened sections 24 (only one blackened section 24 is shown schematically as a representative), which have purposively been formed by the action of a beam of laser light on the carbon-containing additives contained in the first transparent layer 20.

The color coating 22 is located on the surface of the first transparent layer 20. (The color coating 22 is shown with a significant vertical exaggeration in the schematic drawing, in order to be visible in cross-section.)

The color coating 22 shown in FIG. 5A does not contain black color components and reflects visible light and UV light.

In other embodiments (not shown), the color coating 22 can be transparent to UV light.

The color coating 22, which is formed from the base colors cyan, magenta and yellow, and the blackened sections 24 complement one another, at least from the perspective of an observer, to form a complete image. The black portions of the complete image are thereby formed by the blackened sections 24.

The blackened sections 24 thus form a first portion of the optically recognizable characters of the security inlay 500, and the color coating 22 forms a second portion of the optically recognizable characters of the security inlay 500.

FIG. 5A further shows a first UV color coating 28, which is located on the color coating 22. The first UV color coating 28 is transparent to visible light and reflects UV light of a first wavelength and forms a third portion of the optically recognizable characters of the security inlay 500. (The UV color coating 28 is shown with a significant vertical exaggeration in the schematic drawing, in order to be visible in cross-section.)

During irradiation of the security inlay 500 with visible light, the complete image formed jointly by the first portion of the optically recognizable characters and the second portion of the optically recognizable characters is visible to an observer. During irradiation of the security inlay 500 with UV light of a first wavelength, the third portion of the optically recognizable characters is visible to an observer.

FIG. 5B shows a further development of the security inlay 510 having optically recognizable characters for an identity document having a first UV color coating 28. The further development shown in FIG. 5B comprises all the described features of FIG. 5A. In addition, in FIG. 5B the second transparent layer 30 also comprises at least one blackened section 34. The blackened section 34, analogously to the blackened sections 24, is formed by irradiation of the second transparent layer 30 with laser light.

The blackened sections 34 of the second transparent layer 30 form together with the blackened sections 24 of the first transparent layer 20 the first portion of the optically recognizable characters of the security inlay 510.

The blackened sections 34 shown in FIG. 5B of the second transparent layer 30 are not concealed by the color coating 22 from the perspective of the observer. The blackened sections 34 of the second transparent layer 30 that are shown are optically recognizable, analogously to the blackened sections 24 in the first transparent layer 20, but do not overlap with the color coating 22. In the embodiment variant shown in FIG. 5B, the blackened sections 34 of the second transparent layer 30 form a separate optically recognizable character consisting only of blackened sections.

FIG. 5B further shows that a portion of the first UV color coating 28 is located on the color coating 22 and a portion of the first UV color coating 28 is located on the surface of the transparent layer 22. The third portion of the optically recognizable characters, which are formed by the UV color coating 28, thus only partially overlaps the first or second portion of the optically recognizable characters.

FIGS. 5C and 5D show by way of example further embodiments of a security inlay 520, 530 having optically recognizable characters for an identity document having a first UV color coating 28.

FIG. 5C, analogously to FIG. 5A, shows the first transparent layer 20, the blackened sections 24, a second transparent layer 30, the color coating 22 and the first UV color coating 28. Analogously to FIG. 5A, a first portion of the optically recognizable characters is formed by the blackened sections 24, a second portion of the optically recognizable characters is formed by the color coating 22, and a third portion of the optically recognizable characters is formed by the first UV color coating 28.

In the embodiment shown in FIG. 5C, the third portion of the optically recognizable characters overlaps the first portion of the optically recognizable characters, while the second portion of the optically recognizable characters is not overlapped. Thus, during irradiation of the security inlay 520 with visible light, a non-overlapping arrangement of the first and second portions of the optically recognizable characters is visible to the observer. During irradiation of the security inlay 520 with UV light of a first wavelength, an overlapping arrangement of the first, second and third portions of the optical characters is visible.

FIG. 5D, analogously to FIG. 5A, shows the first transparent layer 20, the blackened sections 24, a second transparent layer 30, the color coating 22 and the first UV color coating 28. Analogously to FIG. 5A, a first portion of the optically recognizable characters is formed by the blackened sections 24, a second portion of the optically recognizable characters is formed by the color coating 22, and a third portion of the optically recognizable characters is formed by the first UV color coating 28.

The blackened sections 34 shown in FIG. 5D of the second transparent layer 30 are not concealed by the color coating 22 from the perspective of the observer. The blackened sections 34 of the second transparent layer 30 that are shown are optically recognizable, analogously to the blackened sections 24 in the first transparent layer 20, but do not form a complete image together with the color coating 22. In the embodiment variant shown in FIG. 5D, the blackened sections 34 of the second transparent layer 30 form an optically recognizable character formed only of blackened sections.

Furthermore, in the embodiment shown in FIG. 5D, only a portion of the color coating 22 is covered by the first UV color coating 28. However, the blackened sections 24 of the first transparent layer are completely covered.

Accordingly, during irradiation of the security inlay 530 with visible light, there is visible to the observer an overlapping arrangement of the first and second portions of the optically recognizable characters and also an arrangement of the first portion of the optically recognizable characters that does not overlap with the second portion of the optically recognizable characters.

During irradiation of the security inlay 530 with UV light of a first wavelength, an overlapping arrangement of the first, second and third portions of the optical characters is visible.

FIGS. 5E and 5F show a of the security inlay 540, 550 having optically recognizable characters for an identity document having a first UV color coating 28 and a second UV color coating 29.

The security inlay 540, 550 shown in FIGS. 5E and 5F comprises a first transparent layer 20 and a second transparent layer 30 which are each manufactured from polycarbonate with carbon-containing additives. On the first transparent layer 20 there is located in each case a color coating 22.

The first transparent layer 20 further has a plurality of blackened sections 24 which have been formed by the action of a beam of laser light on the carbon-containing additives contained in the first transparent layer 20.

Analogously thereto, the second transparent layer 30 has a plurality of blackened sections (only one blackened section is shown schematically) which have been formed by the action of a beam of laser light on the carbon-containing additives contained in the second transparent layer 30.

The color coating 22 shown in FIGS. 5E and 5F does not contain black color components and reflects visible light and UV light. In other embodiments (not shown), the color coating 22 can be transparent to UV light and/or also comprise black color components, which are transparent to infrared light.

The color coating 22, which is formed of the base colors cyan, magenta and yellow, and the blackened sections 24 complement one another, at least from the perspective of an observer, to form a complete image. The black portions of the complete image are thereby formed at least partially by the blackened sections 24.

The blackened sections 24 and the blackened sections 34 form a first portion of the optically recognizable characters of the security inlay 540, 550, and the color coating 22 forms a second portion of the optically recognizable characters of the security inlay. The blackened sections 34 of the second transparent layer 30 are not concealed by the color coating 22 from the perspective of the observer. The blackened sections 34 of the second transparent layer 30 that are shown are optically recognizable, analogously to the blackened sections 24 in the first transparent layer 20, but form separate optically recognizable information which is spatially separate from the optically recognizable information that can be perceived under visible light by the observer as a result of the combination of the blackened sections 24 with the color coating 22. The blackened sections 34 can form, for example, optically recognizable text information (e.g. names, addresses, personal data) and in other embodiments (not shown) can be overlapped by the first and/or second UV color coating.

FIGS. 5E and 5F further show a first UV color coating 28 which is located on the color coating 22. The first UV color coating 28 is transparent to visible light and reflects UV light of a first wavelength and forms a third portion of the optically recognizable characters of the security inlay 540, 550.

FIGS. 5E and 5F additionally show a second UV color coating 29 which is transparent to visible light and reflects UV light of a second wavelength. The second UV color coating 29 forms a fourth portion of the optically recognizable characters of the security inlay 540, 550.

In the exemplary embodiment shown in FIG. 5E, both first UV color coating 28 and the second UV color coating 29 are located on a portion of the color coating 22. In other exemplary embodiments (not shown), the first UV color coating 28 and/or the second UV color coating 29 can only partially overlap the color coating 22.

In the exemplary embodiment shown in FIG. 5F, the first UV color coating 28 is located on the color coating 22 and the second UV color coating 29 is located on the UV color coating 28.

During irradiation of the security inlay 540, 550 shown in FIGS. 5E and 5F with visible light, the complete image formed jointly by the first portion of the optically recognizable characters and the second portion of the optically recognizable characters is visible to an observer. In addition, the first portion of the optical characters, which is not overlapped by the second portion of the optical characters, is also visible.

During irradiation of the security inlay 540, 550 with UV light of a first wavelength, the third portion of the optically recognizable characters is visible to an observer.

During irradiation of the security inlay 540, 550 with UV light of a second wavelength, the fourth portion of the optically recognizable characters is visible to an observer.

FIG. 5G shows a security inlay 560 having the color coating 22, the first UV color coating 28 and the second UV color coating 29. The first UV color coating 28 and the second UV color coating 29 are multicolored UV color coatings in FIG. 5G. The first UV color coating 28 and the color coating 22 are located on the first transparent layer 20. The second UV color coating 29 is located on the color coating 28. In the exemplary embodiment shown in FIG. 5G, the color coating 22 reflects visible light and UV light. Of course, embodiments of the security inlay 560 are also possible in which the color coating 22, the first UV color coating 28 and the second UV color coating 29 do not overlap one another, so that the color coating 22, the first UV color coating 28 and the second UV color coating 29 are each applied directly to the first transparent layer 20 without overlying one another.

In the embodiment shown in FIG. 5G, the third portion of the optically recognizable characters formed by the first UV color coating 28 shows to the observer of the security inlay 560 during irradiation of the security inlay 560 with UV light of a first wavelength, for example, a facial image of an owner of the security inlay 560. The same facial image can be shown in the embodiment shown in FIG. 5G jointly by the first portion of the optically recognizable characters, which is formed by the blackened sections 24, and the second portion of the optically recognizable characters, which is formed by the color coating 22.

Thus, during irradiation of the security inlay 560 with visible light, the facial image consisting of the first and second portions of the optically recognizable characters is visible. During irradiation of the security inlay 560 with UV light, the facial image consisting of the first and second portions of the optically recognizable characters and in addition the same facial image consisting of the third portion of the optically recognizable characters are visible. The facial images can thus be compared with one another, which, for example, makes it difficult for unauthorized parties to replace the facial image.

In the exemplary embodiment shown in FIG. 5G, the second UV color coating 29 is bifluorescent and forms a fourth portion of the optically recognizable characters, which form additional security features. Thus, during irradiation of the security inlay 560 with UV light having a wavelength of 313 nm, the second UV color coating 29 shows to the observer of the security inlay 560 a security feature with a red color impression. During irradiation of the security inlay 560 with UV light having a wavelength of 365 nm, the security inlay 560 shows to the observer a security feature with a blue color impression.

Figure 6:
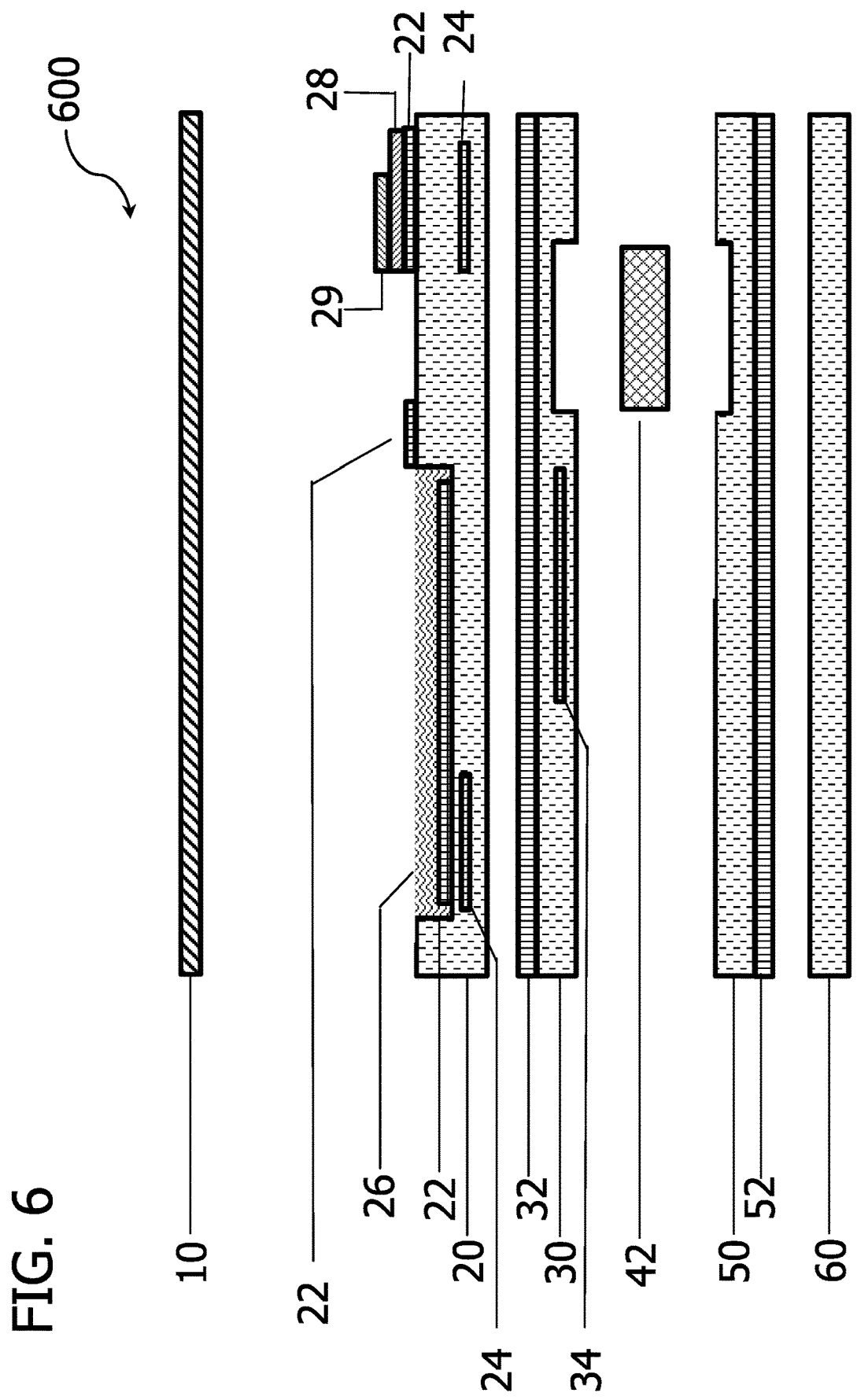
FIG. 6 shows an exemplary embodiment of a security inlay for an identity document which comprises a first, second, third and fourth portion of optically recognizable characters and also a depression in the first transparent layer.

FIG. 6 shows a security inlay 600 having optically recognizable characters for an identity document having a depression, a first UV color coating and a second UV color coating.

FIG. 6 shows a cover layer 10, a first transparent layer 20, a second transparent layer 30, an insert 42, a third transparent layer 50 and a fourth transparent layer 60.

In alternative embodiments, the security inlay can also comprise a printed lacquer layer (not shown) in addition or alternatively to the cover layer 10 shown in FIG. 6. In embodiments which comprise a printed lacquer layer instead of a cover layer 10, the lacquer layer is arranged analogously to the cover layer 10 and performs the protective function thereof for the surface of the security inlay.

The insert 42 is located in a depression of the second transparent layer 30 and in a depression of the third transparent layer 50.

The first transparent layer 20, the second transparent layer 30, the third transparent layer 50 and the fourth transparent layer 60 are manufactured from a polycarbonate material and comprise carbon-containing additives which form blackened sections under the action in particular of laser light. The blackened sections can be formed in a desired intensity by regulating the intensity and duration of action of the laser light.

The first transparent layer 20 has a plurality of blackened sections 24, which have been formed by the action of a beam of laser light on the carbon-containing additives contained in the first transparent layer 20.

Analogously thereto, the second transparent layer 30 has a plurality of blackened sections 34 (only one blackened section is shown schematically), which have been formed by the action of a beam of laser light on the carbon-containing additives contained in the second transparent layer 30.

In a further development (not shown), one of the transparent layers 20, 30, 50, 60 and/or the insert 40 can comprise a hologram element which is visible to an observer of the security inlay 440 and has a visual-holographic effect. The visual-holographic effect can be optically recognizable both under visible light and under invisible light, in particular under infrared and/or ultraviolet light.

The hologram element can overlap, at least from the perspective of an observer, with a portion of the optically recognizable characters.

In other further developments (not shown), the hologram element can also be arranged between the transparent layers and/or the insert. In particular, the hologram element can be arranged between the first transparent layer and the second transparent layer or between the second transparent layer and the insert.

In one exemplary embodiment (not shown), the hologram element can at least partially overlap with the third and/or fourth portion of the optically recognizable characters.

In another further development (not shown), the insert 42 can have at least two opaque insert layers which enclose an RFID chip and/or an antenna element.

FIG. 6 further shows a first background color coating 32 and a second background color coating 52. The first background color coating 32 is located on the surface of the second transparent layer 30 that faces towards the cover layer 10. The second background color coating 52 is located on the surface of the third transparent layer 50 that faces away from the cover layer 10.

The first transparent layer 20 shown in FIG. 6 has a depression.

FIG. 6 further shows a color coating 22 which is located in part in the depression of the first transparent layer 20. (The color coating 22 is shown with a significant vertical exaggeration in the schematic drawing, in order to be visible in cross-section.)

The color coating 22 is formed by a color imprint of the base colors cyan, magenta and yellow.

The color coating 22 shown in FIG. 6 does not have black color components, is transparent to infrared light and reflects visible and ultraviolet light.

The color coating 22 and the blackened sections 24, 34 complement one another, at least from the perspective of an observer, to form a complete image. The black portions of the complete image are thereby formed by the blackened sections 24, 34. The blackened sections 24, 34 reflect both invisible, in particular ultraviolet and infrared, light and visible light.

FIG. 6 further shows a polymer material 26 which is located in the depression of the first transparent layer 20. The polymer material 26 shown is transparent to visible and invisible, in particular ultraviolet or infrared, light and is heat-curable.

In one embodiment (not shown), the polymer material can comprise an additive which reflects UV light in a first and/or in a second wavelength range, in particular color pigments which reflect UV light.

In a further development (not shown), the polymer material can comprise forensic markers, in particular silicon, silicon dioxide, mica, titanium oxide and/or tin oxide.

The polymer material 26 located in the depression of the first transparent layer 20 is flush with the surface of the first transparent layer 20, so that the overall surface of the first transparent layer 20 and of the polymer material 26 forms a planar surface without raised or depressed portions.

The transparent polymer material located in the depression encloses, together with the first transparent layer 20, a portion of the color coating 22.

FIG. 6 further shows a first UV color coating 28 which is located on the color coating 22. The first UV color coating 28 is transparent to visible and infrared light and reflects UV light of a first wavelength.

FIG. 6 additionally shows a second UV color coating 29 which is transparent to visible and infrared light and reflects UV light of a second wavelength. The second UV color coating 29 is located on the first UV color coating 28.

The blackened sections 24, 34 thus form a first portion of the optically recognizable characters of the security inlay 600, and the color coating 22 forms a second portion of the optically recognizable characters of the security inlay 600. The first UV color coating 28 forms a third portion of the optically recognizable characters, and the second UV color coating 29 forms a fourth portion of the optically recognizable characters.

Thus, if the security inlay 600 is irradiated with visible light, the first and second portions of the optically recognizable characters are visible to the observer, wherein the first and second portions of the optically recognizable characters partially overlap and thus form a complete image.

If the security inlay 600 is irradiated with infrared light, only the first portion of the optically recognizable characters is visible to the observer.

If the security inlay 600 is irradiated with UV light of a first wavelength, the third portion of the optically recognizable characters is visible.

If the security inlay 600 is irradiated with UV light of a second wavelength, the fourth portion of the optically recognizable characters is visible.

It will be appreciated that the exemplary embodiments described hereinbefore are not exhaustive and do not limit the subject-matter disclosed herein. In particular, it is clear to the person skilled in the art that he can combine the described features with one another as desired and/or can omit different features without thereby departing from the scope of the subject-matter disclosed herein.

The invention claimed is:

1. A security inlay having optically recognizable characters for an identity document, comprising:
   a first transparent layer manufactured from polycarbonate or polyethylene terephtalate,
   a color coating located on the first transparent layer, said color coating including different color components from cyan, magenta and yellow and being an ink-jet printed color coating,
   a UV-curable lacquer layer that is applied to the first transparent layer and to the color coating, wherein the lacquer layer includes forensic markers that cannot be recognized with the naked eye, and
   a second transparent layer, wherein
   the first and the second transparent layers are bonded together,
   at least one of the transparent layers comprises blackened sections,
   the color coating is transparent to infrared light,
   a first portion of the optically recognizable characters is formed by the blackened sections in at least one of the first and second transparent layers, and
   a second portion of the optically recognizable characters is so formed by the color coating that
   the first and the second portions of the optically recognizable characters reflect visible light and the first portion of the optical characters reflects infrared light, wherein the blackened sections and the color coating combine to form a complete image that is visible during irradiation with visible light such that the security inlay shows graphical information formed jointly by the first portion of the optically recognizable characters and the second portion of the optically recognizable characters, and wherein black portions of the complete image are formed by the blackened sections and color portions of the complete image are formed by the color coating.

2. The security inlay for an identity document as claimed in claim 1, wherein
at least one of the first and second transparent layers is to be blackened by the action of at least one beam of laser light.

3. The security inlay for an identity document as claimed in claim 1, wherein
the blackened sections in at least one of the first and second transparent layers have omissions.

4. The security inlay for an identity document as claimed in claim 1, further comprising:
an insert which comprises at least a first opaque insert layer, and/or
a third transparent layer which is to be blackened by laser light, and/or
a fourth transparent layer which is to be blackened by laser light, and/or
a first background color coating located on the second transparent layer, and/or
a second background color coating located on the third transparent layer.

5. The security inlay for an identity document as claimed in claim 4, wherein the insert comprises:
a second opaque insert layer, and/or
an arrangement of electronic components including an antenna module and/or an RFID chip.

6. The security inlay for an identity document as claimed in claim 4, wherein
at least one of the transparent layers comprises a hologram element, and/or wherein
at least one hologram element is arranged between two of the transparent layers or between one of the transparent layers and the insert, and/or wherein
at least one of the transparent layers is bonded with at least one of the other transparent layers and/or with the insert by lamination.

7. The security inlay for an identity document as claimed in claim 4, wherein
the color coating and/or the first background color coating and/or the second background color coating are formed from solvent-containing, pigment-based, inks, wherein
the solvent-containing, pigment-based, inks are suitable for dissolving and at least partially penetrating a surface of polycarbonate or polyethylene terephtalate during an application process, and/or
the color coating and/or the first background color coating and/or the second background color coating includes silicon, silicon dioxide, mica, titanium oxide and/or tin oxide forensic markers.

8. The security inlay for an identity document as claimed in claim 1, wherein
the second transparent layer is manufactured from polycarbonate or polyethylene terephtalate.

9. The security inlay for an identity document as claimed in claim 1, wherein
the lacquer layer is transparent to visible light and/or infrared light and/or UV light, and/or
at least a portion of the lacquer layer comprises a manufacturing material of methacrylate, polyester acrylate or urethane acrylate, and/or
the lacquer layer comprises a heat curable manufacturing material.

10. The security inlay for an identity document as claimed in claim 9, wherein
the lacquer layer and/or at least one of the transparent layers includes nanoscale luminophores which are configured to reflect UV light of a predetermined wavelength.

11. The security inlay for an identity document as claimed in claim 1, wherein
the lacquer layer covers the color coating, so that
the color coating is completely enclosed between the first transparent layer and the lacquer layer.

12. The security inlay for an identity document as claimed in claim 1, wherein
the lacquer layer comprises nanoscale luminophores, which reflects UV light.

13. The security inlay for an identity document as claimed in claim 1 wherein the first transparent layer includes a depression, and wherein the color coating is located at least partially in the depression on the first transparent layer, and wherein the depression is filled with the lacquer layer so that at least a portion of the color coating is enclosed by the first transparent layer and the lacquer layer.

14. The security inlay for an identity document as claimed in claim 1 wherein the temperature resistance of the lacquer layer is greater than the temperature resistance of the first transparent layer.

15. The security inlay for an identity document as claimed in claim 1 wherein the lacquer layer is from 5 to 20 percent larger than the area of the color coating located on the first transparent layer.

16. The security inlay for an identity document as claimed in claim 1 wherein said forensic markers comprise silicon, silicon dioxide, mica, titanium and/or tin oxide.

17. A method for producing a security inlay having optically recognizable characters for an identity document, comprising the steps of:
providing a first transparent layer manufactured from polycarbonate or polyethylene terephtalate,
providing a second transparent layer,
producing a first portion of the optically recognizable characters by blackened portions in at least one of the transparent layers by a beam of laser light,
producing a second portion of the optically recognizable characters by applying a color coating to the first transparent layer using ink-jet printing, said color coating including different color components from cyan, magenta and yellow, wherein the blackened portions and the color coating combine to form a complete image that is visible during irradiation with visible light such that the security inlay shows graphical information formed jointly by the first portion of the optically recognizable characters and the second portion of the optically recognizable characters, and wherein black portions of the complete image are formed by the blackened sections and color portions of the complete image are formed by the color coating, and
applying a UV-curable lacquer layer onto the first transparent layer and the color coating before the color coating is completely dried or cured.

18. The method for producing a security inlay as claimed in claim 17, wherein
for producing the color coating there are used inks that dissolve and at least partially penetrate a surface of the first transparent layer, which is manufactured from polycarbonate or polyethylene terephthalate, and/or the transparent layers are bonded together by lamination.

19. The method for producing a security inlay as claimed in claim 17, further comprising at least one of the steps of:

producing a depression in the first transparent layer by pressing and/or embossing and/or milling, and filling the depression with a transparent heat and/or UV curable material or the lacquer layer.

* * * * *